US011251959B2

(12) United States Patent
Wentz

(10) Patent No.: US 11,251,959 B2
(45) Date of Patent: Feb. 15, 2022

(54) METHOD OF MANUFACTURING A SECURE COMPUTING HARDWARE APPARATUS

(71) Applicant: Ares Technologies, Inc., Cambridge, MA (US)

(72) Inventor: Christian T Wentz, Providence, RI (US)

(73) Assignee: Ares Technologies, Inc., Boston, MA (US)

( * ) Notice: Subject to any disclaimer, the term of this patent is extended or adjusted under 35 U.S.C. 154(b) by 133 days.

(21) Appl. No.: 16/506,658

(22) Filed: Jul. 9, 2019

(65) Prior Publication Data

US 2021/0091952 A1 Mar. 25, 2021

Related U.S. Application Data

(60) Provisional application No. 62/695,538, filed on Jul. 9, 2018.

(51) Int. Cl.
*H04L 9/32* (2006.01)
*G06F 21/79* (2013.01)
*H01L 23/00* (2006.01)
*H04L 9/08* (2006.01)
*H04L 9/30* (2006.01)

(52) U.S. Cl.
CPC ............ *H04L 9/3218* (2013.01); *G06F 21/79* (2013.01); *H01L 23/573* (2013.01); *H04L 9/0866* (2013.01); *H04L 9/30* (2013.01); *H04L 9/3247* (2013.01); *H04L 9/3278* (2013.01); *H04L 2209/46* (2013.01)

(58) Field of Classification Search
None
See application file for complete search history.

(56) References Cited

U.S. PATENT DOCUMENTS

| 10,320,569 B1* | 6/2019 | Wentz ................. H04L 9/0866 |
| 2013/0051552 A1* | 2/2013 | Handschuh .......... H04L 9/0866 380/44 |
| 2013/0194886 A1 | 8/2013 | Schrjen et al. |
| 2018/0341737 A1 | 11/2018 | Chow et al. |

OTHER PUBLICATIONS

PCT/US20/40897, International Search Report, dated Sep. 24, 2020.
Roberts, et al.; Using Quantum Confinement to Uniquely Identify Devices; Scientific Reports; Nov. 10, 2015.

\* cited by examiner

*Primary Examiner* — Jeffrey C Pwu
*Assistant Examiner* — Mayasa A. Shaawat
(74) *Attorney, Agent, or Firm* — Caldwell Intellectual Property Law, LLC

(57) ABSTRACT

A method of manufacturing a secure computing hardware apparatus includes receiving at least a secret generator, wherein the secret generator is configured to generate a module-specific secret, receiving a device identifier, wherein the device identifier is configured to produce at least an output comprising a secure proof of the module-specific secret, and communicatively connecting the device identifier to the secret generator.

20 Claims, 6 Drawing Sheets

METHOD OF MANUFACTURING A SECURE COMPUTING HARDWARE APPARATUS

CROSS-REFERENCE TO RELATED APPLICATIONS

This application claims priority to Provisional Application No. 62/695,538 filed on Jul. 9, 2018 and entitled "SECURE COMPUTING MODULE AND METHODS OF MANUFACTURING A SECURE COMPUTING MODULE" the entirety of which is incorporated herein by reference.

FIELD OF THE INVENTION

The present invention generally relates to the field of data storage and authentication in distributed computing systems. In particular, the present invention is directed to a secure computing hardware apparatus and methods of manufacturing a secure computing hardware apparatus.

BACKGROUND

A vital part of computer security is device authentication: determining which computing device has performed an action, particularly across a network, is crucial to deciding the degree to which such an action is trustworthy. First, where a particular device identifies itself with an institution or person, it may be possible to check such associations where the identity of the device itself is known; possession of the device by a person can be secondarily verified by passwords, purchase histories, and similar means. Patterns of behavior by a device may also be tracked over time, to establish a basis for trust. However, existing methods for device identification have flaws permitting hostile parties to frustrate accurate identification. Certificate authorities, for instance, may possess a private key associated with digital certificates, creating an additional party that must be trusted or from whom the private key may be stolen by hackers; the private key, as data, may be stolen from the device it purports to identify, and freely shared between devices. As a result, it is not always possible to definitely identify a device.

SUMMARY OF THE DISCLOSURE

In an aspect, a method of manufacturing a secure computing hardware apparatus, includes receiving at least a secret generator, wherein the secret generator is configured to generate a module-specific secret. The method includes receiving a device identifier, wherein the device identifier is configured to produce at least an output comprising a secure proof of the module-specific secret. The method includes communicatively connecting the device identifier to the secret generator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
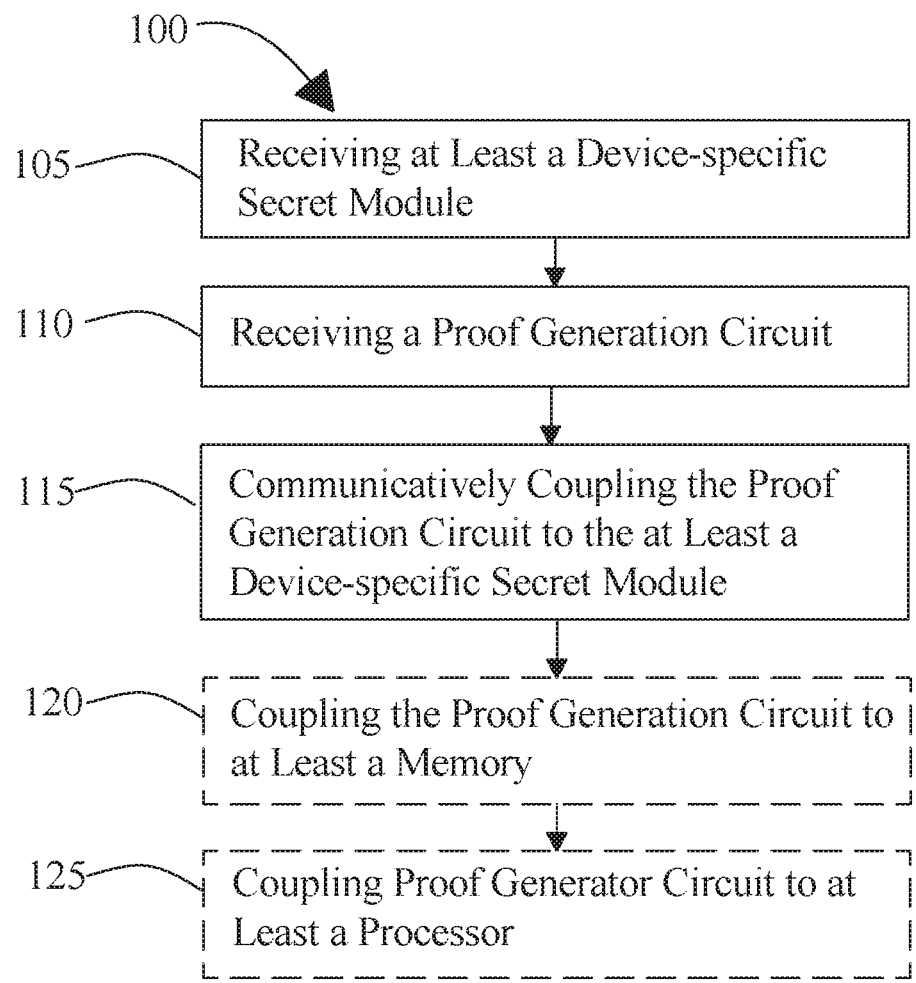
FIG. 1 is a flow diagram illustrating an exemplary method of manufacturing a secure computing hardware apparatus.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to hardware components that identify or "fingerprint" a particular device incorporating such components to a high degree of certainty, and to methods for manufacturing such components and computing devices incorporating them. Composition of such components, and the methods used to produce them, may achieve two goals: creation of a secret identifying only the component in question, which may be known to no device or person outside the component, and a protocol demonstrating, through secure proof, the possession of the secret by the component, without revealing any part of the secret to an evaluating party or device. This may ensure authenticity and integrity of the device as well as the software components that may make up the device. Further, this may ensure that code executed on hardware within a secure enclave is authentic and to ensure that the device and software working together, both have features in place to protect against tampering or observation by malicious software operating on the same device. This may be accomplished by the creation of one or more circuits or electrical components that generate the secret and resist attempts at analysis or probing with electrical devices to uncover the secret. The one or more circuits or components may also be constructed in such a way that even the manufacturer cannot predict outputs; where the outputs in turn are provided according to a secure proof protocol, discovery of the secret using such outputs may also be impossible. Secure proof may be accomplished, among other possibilities, using a digital signature.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Figure 2:
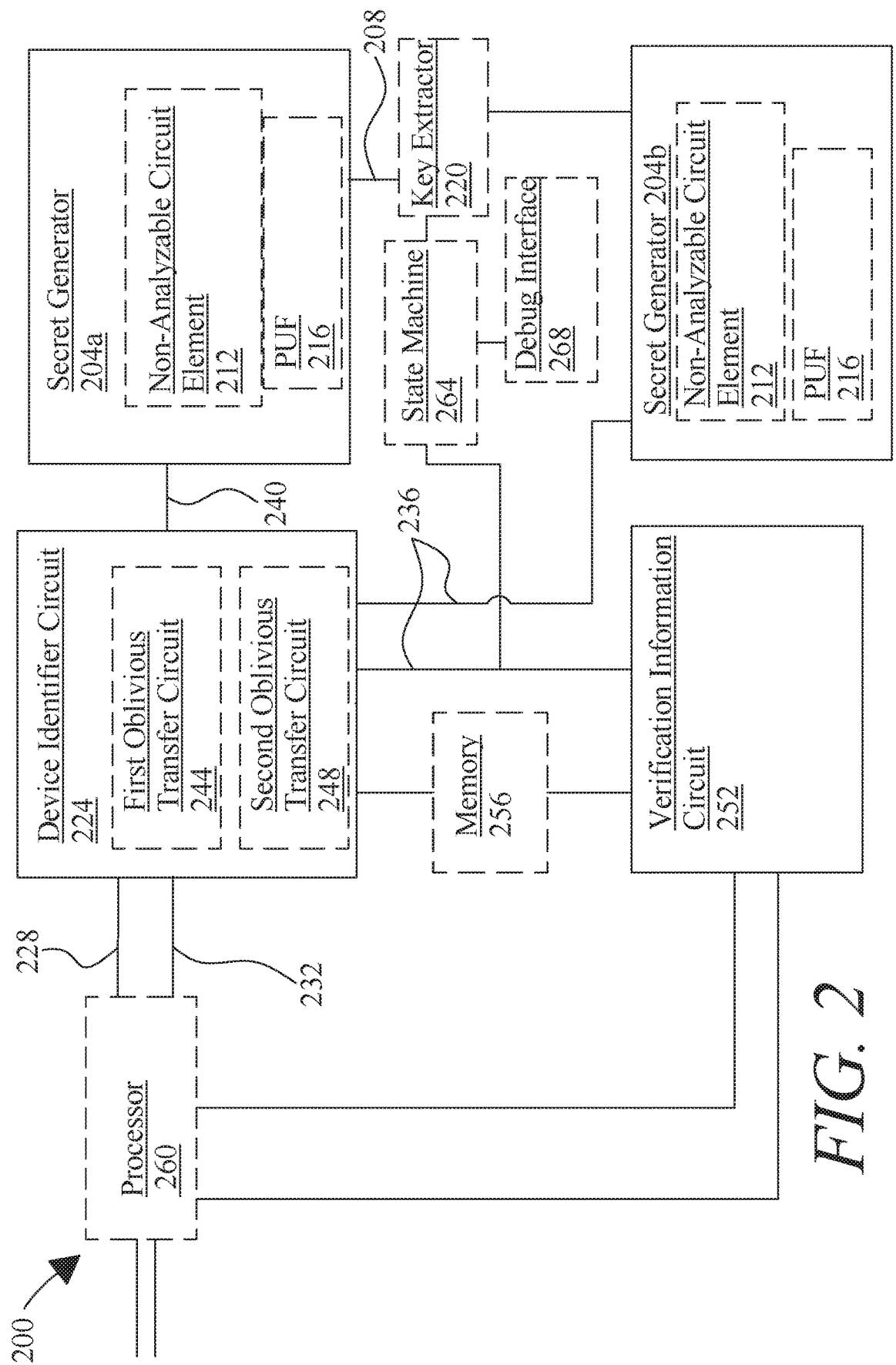
FIG. 2 is a block diagram illustrating an exemplary embodiment of a secure computing hardware apparatus.

Referring now to FIG. 1, an exemplary embodiment of a method 100 of manufacturing a secure computing hardware apparatus is illustrated. At step 105, method includes receiving at least a secret generator. FIG. 2 illustrates a non-limiting example of a secure computing hardware apparatus 200 in an embodiment. At least a secret generator 204*a-b* may be configured to generate a module-specific secret. A module-specific secret, as used herein, is a piece of information uniquely linked to at least a secret generator 204*a-b*, and/or a certain collection or lot of devices, such as a set of devices produced by a particular manufacturer in a particular batch, where uniqueness indicates a very low probability that any other device and/or any other device in a lot of devices sharing a given device-specific secret has been manufactured to generate the module-specific secret, and a manufacturer performing this method does not manufacture any other device configured to generate the module-specific secret, except where device-specific secret is a group key or other group secret included in a set of devices by a manufacturer. As a non-limiting example, a module-specific secret may include a private key of a public-key cryptographic system as described above. Alternatively or additionally, module-specific secret may include one or more numbers randomly generated by at least a secret generator 204*a-b*; one or more numbers may be sufficiently large, and generated in a sufficiently random way, to ensure that one or more numbers are unique to secret generator. Various protocols exist to ensure that a number or other element of data may be unique as defined above; examples include the globally unique identifier (GUID) and/or universally unique identifier (UUID) protocol, for instance as standardized by the Open Software Foundation. Generally, where a number represented by a sufficient number of binary bits or the equivalent is derived by a random process, probability of a duplicate number being independently generated may be essentially zero; for instance, a randomly selected number output using n bits (assuming a simple binary encoding as opposed to a twos complement scheme) may have any value between 0 and $2^n$, making the probability of any process producing the same number $\frac{1}{2}^n$; thus, for instance, the probability of a device or process independently generating a 1000-bit number having the same output as another such device is approximately $10^{-400}$. Outputs may be truly random in an embodiment, by utilizing various designs or methods as described below. Persons skilled in the art, upon reviewing the entirety of this disclosure, will be aware of various ways in which module-specific secrets may be generated as described herein, including without limitation through use of various components and/or methodologies disclosed below.

Still referring to FIG. 2, at least a module-specific secret may be stored in at least a secret generator in one or more memory modules as described below, such as a write-only register, a read-only memory module, or the like. Alternatively or additionally, at least a module-specific secret may be and/or include an output generated by one or more circuit elements or components of at least a secret generator, for instance as described in further detail below. At least a module-specific secret may take the form of any suitable datum or cryptographic element, including without limitation a credential, token, response of a challenge-response pair, digital signature, or any other datum or cryptographic object used for access control, device authentication, and/or device identification. In an embodiment, module-specific secret and/or a proof of module-specific secret generated for instances as described in further detail below may be compared to existing module-specific secrets and/or proofs of existing module-specific secrets; this may be accomplished, as a non-limiting example, by maintaining a data structure such as a database or hash table storing all previously created module-specific secretes. Where at least a secret generator 204*a-b* is discovered to possess one or more duplicate module-specific secrets, secret generator 204*a-b* may be discarded and replaced with a substitute module, which may be similarly tested. Alternatively, or additionally, at least a secret generator 204*a-b* may include multiple secret generators 204*a-b* that are combined to produce module-specific secret together, or multiple module-specific secrets, greatly reducing probability of a duplicate.

Still viewing FIG. 2, at least a secret generator 204*a-b* may include one or more circuit elements, including without limitation at least an output 208; at least an output 208 may include one or more ports or pins that output data in the form of an electrical signal. Electrical signal may include any constant or variable voltage signal, current signal, or other signal associated with levels or variations of one or more electronic circuit parameters. Electrical signal may include one or more "bits" of a digital signal, including without limitation voltage levels corresponding to "logic 1" and/or "logic 0" as established by upper and lower input or output threshold voltage levels in a digital or logical circuit. At least a secret generator 204*a-b* may include one or more additional circuit elements; in an embodiment one or more additional circuit elements may include any component or set of components capable of generating all or part of module-specific secret. As a non-limiting example, at least a secret generator 204*a-b* may include a digital circuit that, given certain inputs that may be standardized, outputs a secret key of a private key cryptographic system.

With continued reference to FIG. 1, at least a secret generator 204*a-b* may include an analog circuit that generates and/or outputs a signal representing or based on at least a module-specific secret; signal may correspond to one or more digital bits, for instance by matching an upper or lower digital threshold, or may be converted to a digital signal using any suitable modality, including digital sampling, analog-to-digital conversion, or the like. As a non-limiting example, analog signal may encode or represent module-specific secret or a datum based on module-specific secret using one or more attributes of a waveform, which may be periodic or near-periodic; such attributes may include frequency, amplitude, or the like. Attributes may include a Fourier-series set of predominating periodic frequencies; for instance, a periodic or non-periodic waveform may be decomposed into component frequencies, and some subset thereof, based for instance on relative dominance, may be selected and converted to one or more digital numbers. Outputs of secret generator 204*a-b* may be subjected to one or more error correction protocols; for instance, outputs may be encoded using error correcting codes, to ensure that signal is consistently encoded in digital form, despite, for instance, small fluctuations in signal. In an embodiment, at least a secret generator 204*a-b* may include a hardware module, which may be an integrated circuit, an optoelectronic circuit, a section of an integrated circuit on the same die as a processor 260, an integrated circuit packaged with other die in a multi-chip module or other multi-die integration method, or printed circuit board product; at least a secret generator 204*a-b* may have any suitable elements of digital or analog circuitry usable to perform one or more processes as described herein, including without limitation processes used to determine confidence levels and/or authenticate digitally signed assertions as described below.

Still viewing FIG. 2, in an embodiment, at least a secret generator 204*a-b* may be received from a third-party manufacturer; third party manufacturer may construct any element suitable for use as at least a secret generator 204*a-b* according to any suitable process, including without limitation processes described herein for fabrication of at least a secret generator 204*a-b* and/or components thereof. In an embodiment, a first secret generator of the at least a module-specific secret module may be received from a first third-party manufacturer while a second secret generator of the at least a module-specific secret module may be received from a second third-party manufacturer; similarly, a first secret generator may be received from a first third-party manufacturer while the second is fabricated, for instance as described in further detail below. Various secret generators may be combined with each other and/or with other elements of secure computing hardware apparatus as described in further detail below. Module-specific secret may include a group key generated by a manufacturer of at least a secret generator 204*a-b*, including without limitation a manufacturer implementing any embodiment of this method; group key, and/or a group secret analogous to group key, may be created to implement a manufacturer-secured authentication method such as EPID and/or direct anonymous attestation (DAA).

With continued reference to FIG. 2, receiving at least a secret generator 204*a-b* may further include fabricating the secret generator. In an embodiment, fabrication may be performed by assembling one or more electrical components in one or more circuits. Electrical components may include passive and active components, including without limitation resistors, capacitors, inductors, switches or relays, voltage sources, and the like. Electrical components may include one or more semiconductor components, such as diodes, transistors, and the like, consisting of one or more semiconductor materials, such as without limitation silicon, processed with dopants, oxidization, and ohmic connection to conducting elements such as metal leads. Some components may be fabricated separately and/or acquired as separate units and then combined with each other or with other portions of circuits to form circuits. Fabrication may depend on the nature of a component; for instance, and without limitation, fabrication of resistors may include forming a portion of a material having a known resistivity in a length and cross-sectional volume producing a desired degree of resistance, an inductor may be formed by performing a prescribed number of wire winding about a core, a capacitor may be formed by sandwiching a dielectric material between two conducting plates, and the like. Fabrication of semiconductors may follow essentially the same general process in separate and integrated components as set forth in further detail below; indeed, individual semiconductors may be grown and formed in lots using integrated circuit construction methodologies for doping, oxidization, and the like, and then cut into separate components afterwards.

Continuing to refer to FIG. 2, one or more components and/or circuits may be fabricated together to form an integrated circuit. This may generally be achieved by growing at least a wafer of semiconductor material, doping regions of it to form, for instance, npn junctions, pnp junctions, p, n, p+, and or n+ regions, and/or other regions with local material properties, to produce components and terminals of semiconductor components such as base, gate, source and drain regions of a field-effect transistor such as a so-called metal oxide field-effect transistor (MOSFET), base, collector and emitter regions of bipolar junction BJT transistors, and the like. Persons skilled in the art will be aware of various forms or categories of semiconductor devices that may be created, at least in part, by introducing dopants to various portions of a wafer. Further fabrication steps may include oxidization or other processes to create insulating layers, including without limitation at the gate of a field-effect transistor, formation of conductive channels between components, and the like. In some embodiments, logical components may be fabricated using combinations of transistors and the like, for instance by following a complimentary MOSFET (CMOS) process whereby desired element outputs based on element inputs are achieved using complementary circuits each achieving the desired output using active-high and active-low MOSFETS or the like. CMOS and other processes may similarly be used to produce analog components and/or components or circuits combining analog and digital circuit elements. Deposition of doping material, etching, oxidization, and similar steps may be performed by selective addition and/or removal of material using automated manufacturing devices in which a series of fabrication steps are directed at particular locations on the wafer and using particular tools or materials to perform each step; such automated steps may be directed by or derived from simulated circuits as described in further detail below.

With continued reference to FIG. 2, fabrication may include the deposition of multiple layers of wafer; as a nonlimiting example, two or more layers of wafer may be constructed according to a circuit plan or simulation which may contemplate one or more conducting connections between layers; circuits so planned may have any three-dimensional configuration, including overlapping or interlocking circuit portions, as described in further detail below. Wafers may be bound together using any suitable process, including adhesion or other processes that securely bind layers together; in some embodiments, layers are bound with sufficient firmness to make it impractical or impossible to separate layers without destroying circuits deposited thereon. Layers may be connected using vertical interconnect accesses (VIA or via), which may include, as a non-limiting example, holes drilled from a conducting channel on a first wafer to a conducting channel on a second water and coated with a conducting material such as tungsten or the like, so that a conducting path is formed from the channel on the first wafer to the channel on the second wafer. Wafers may be constructed with sufficient thinness to permit VIA-based PUF construction as described in further detail below. VIAs may also be used to connect one or more semiconductor layers to one or more conductive backing connections, such as one or more layers of conducting material etched to form desired conductive paths between components, separate from one another by insulating layers, and connected to one another and to conductive paths in wafer layers using VIAs.

Still referring to FIG. 2, fabrication may include simulation on a computing device, which may be any computing device as described in this disclosure. Simulation may include, without limitation, generating circuit diagram such as a digital or logical circuit diagram; digital or logical circuit diagram may be used in an automated manufacturing process to print or etch one or more chips and/or integrated circuits. Circuit configurations to hardcode logical or mathematical processes as described below may be simulated prior to physical fabrication; similarly, garbled circuits, circuits generated to instantiate one or more secure multi-party computations as described in further detail below, and/or circuit configurations arranged to make probing or analysis physically infeasible may be simulated, for instance by first generating a simulation of a circuit to produce a desired output and then modifying it according to garbling, secure multiparty computation, or obfuscating protocols to create a second simulation from which the circuit or circuit element may be physically fabricated.

With continued reference to FIG. 2, simulation may be performed in a computer-assisted design (CAD) program. CAD program may include a circuit simulation program and/or a program that permits circuit design, such as without limitation Simulation Program with Integrated Circuit Emphasis (SPICE), products based on SPICE, or similar products. CAD program may support layout of circuits including without limitation printed circuit boards (PCB), and the like. CAD program may support, without limitation, circuit schematic diagram drawing, schematic capture and/or design, printed circuit board (PCB) layout production to include both track and component views manual component placement, automatic component placement, manual and automatic routing of PCB tracks, automated guidance of correct track and pad sizing, automated guidance of requirements for double-sided or multiple circuit boards such as without limitation mother and daughter boards, automated enforcement of one or more design constraints such as, without limitation, a size of a PCB, automated or manual incorporation of test points or test indicators, automated or manual inclusion of mounting holes, automated or manual inclusion of vertical interconnect accesses, automated or manual inclusion of component and/or pin identification, and/or bill of material production. CAD program may include one or more parts or component libraries. CAD program may support generation of export files and/or importation of files, including without limitation Gerber files, Drawing Exchanger Format (DXF) files, intermediate data format (IDF) and related files, comma-separated value (CSV) files, text (TXT) files, and the like. CAD programs may include, without limitation DIPTRACE by Stanislav Ruyev and Victor Savenko of Ukraine, SOLIDWORKS PCB as produced by Dassault Systemes Solidworks Corporation of Waltham, Mass., Altium Designer 17, ULTI-BOARD by National Instruments Corporation of Austin, Tex., PCB ARTIST by Advanced Circuits of Aurora, Colo., PCBWEB, believed to be produced by Silicon Frameworks, LLC of Boise Id., BSCH3V by Suigyodo.

Still referring to FIG. 2, CAD program or a similar program may be used to generate and/or design a circuit diagram, to produce a PCB layout, to incorporate components from component or part libraries, or the like. CAD program may be used to generate one or more instructions for printing, etching, assembly, or other automated manufacturing steps to combine or manufacture circuits, including without limitation PCBs, chips, and/or components. For instance, a user may design a circuit topology for at least a secret generator 204a-b based on an intended output; intended output may include, without limitation, device-specific secret, a share or hash based on device-specific secret, a digital signature or proof based on device-specific secret, or the like. Where at least a secret generator 204a-b includes a physically unclonable function (PUF) as described below, user may design a circuit configured to produce an output of the PUF, without necessarily knowing what the output will be, aside from, as an example, a number of output pins by which output will be produced. Thus, for instance, where manufacture of at least a secret generator 204a-b includes manufacture of an intrinsic PUF as introduced in further detail below, simulation may involve simulation of an integrated circuit to be used as the PUF, whereas manufacturing variations used to generate the unpredictable response of the PUF may be produced during manufacturing itself, and thus inherently may not be simulated.

With continued reference to FIG. 2, simulation may include, without limitation, insertion of one or more components in simulated circuit. One or more components may be inserted, for instance, by retrieval from one or more component libraries; as a non-limiting example, a user may specify that a particular component be inserted at a particular node or connected to one or more wires, by dragging or otherwise copying a visual representation of the component onto the circuit, by selecting one or more nodes or wires and commanding insertion of a component by part number, selection from a dropdown list, or the like, or by any other suitable means. Insertion of a component may include specification of one or more wire or terminal connections. Insertion of a component may include specification of a manner for inclusion in a physical circuit to be manufactured; for instance, insertion may include specification whether the component is to be formed with an integrated circuit via CMOS or similar processes or to be attached to the integrated circuit via soldering or the like after separate acquisition or formation. Components simulated may include analog and/or digital components, including without limitation capacitors, inductors, diodes, triodes, transistors, operational amplifiers, logic gates, multiplexors, demultiplexors, latches, flip-flops, inverters, timers, oscillators, sensors, and/or any other elements suitable for inclusion in any circuit as described herein, which may occur to any person skilled in the art upon review of the entirety of this disclosure.

Still referring to FIG. 2, simulation may involve arranging or transforming circuit topology to conform to one or more components to be manufactured, including one or more integrated or printed circuits. Topology may include two-dimensional topology on a single wafer or three-dimensional topology in which a plurality of circuit elements, loops, or other portions are distributed between two or more stacked wavers and connected using VIAs. Topological arrangements may be subjected to one or more automated constraints; for instance, limitations of the area of wafers or chips, along with footprints of components and/or conductive paths may be simulated to limit the scope of a simulation to a chip and/or integrated circuit that is possible to integrate using existent manufacturing methods. Similarly, components that project from a surface of a chip may be constrained to upper or lower layers of a multilayered construction. Topology may be further transformed or arranged to obfuscate or frustrate analysis through probing; for instance, two or more circuits may be simulated as combined in the same single or multilayered chip, with overlapping portions such that probing would likely connect two unrelated circuits. Persons skilled in the art, upon reviewing the entirety of this disclosure, will be aware of various alternative or additional ways in which circuit topologies may be simulated for purposes described herein.

With continued reference to FIG. 2, one or more circuit simulation steps as described above may be automated; for instance, one or more circuit portions, elements, components, or the like may be automatedly connected in simulated form. Where a circuit or a portion thereof being simulated is a logic circuit, simulation may include generating a set of logic gates to perform logical operations or map inputs to outputs as specified by one or more commands or instructions describing desired sets of inputs and output and/or desired logical operations to be implemented. Obfuscation may include converting a first logic circuit performing a particular input-output mapping into a second circuit or set of circuits accomplishing similar or related mappings of inputs to outputs, for instance to implement a secure multiparty computation circuit as described in further detail below.

In an embodiment, and continuing to refer to FIG. 2, simulation and/or physical manufacture of at least a secret generator 204a-b may incorporate one or more genuinely random processes, for instance as generated by a unique object (UNO) fingerprint, and/or a PUF (PUF) as described in further detail below, or any other disorder-based security primitive, defined as a function that creates challenge responses from a physical circuit that depend on unique features of that circuit, including without limitation microstructure features or elements that depend on random physical factors occurring or conferred during manufacture. In an embodiment, and as further illustrated below, introduction of random processes into physical fabrication and/or simulation may result in circuit configurations not fully known to a manufacturing entity or device; for instance, a fabrication process introducing one or more random steps may generate a circuit having parameters not fully matching a simulated circuit from which the fabrication is derived. This may further be accomplished through the generation of PUFs as described in further detail below.

Still referring to FIG. 2, in an embodiment, fabrication of at least a secret generator 204a-b may further include fabrication of at least a non-analyzable circuit element 212. At least a non-analyzable circuit element 212 may include one or more tamper-proofing designs or components to prevent reverse-engineering. As a non-limiting example, at least a non-analyzable circuit element 112 may include one or more tamper-proofing designs or components to prevent reverse-engineering. Tamper-proofing may include sensing of changes to temperature that could indicate attempts to remove a component via de-soldering or related. Temperature sensing may be achieved via direct methods, for instance and without limitation by integrating thermocouples into the secret generator module 104a-b, by measuring current-voltage curves of P-N junctions of diodes, transistors, or other semiconductor components, and/or parasitic P-N junctions in a standard CMOS process integrating thermocouples directly on a silicon die, using proportional to absolute temperature (PTAT) circuits and the like. Temperature sensing may be achieved via indirect methods, in non-limiting examples by detection of changes in circuit performance based on temperature-dependent processes, e.g. oscillation frequency of one or more ring oscillators, changes in propagation time of delay logic as implemented by any known methods, changes in current-voltage (I-V) curves, one or more threshold voltages in a transistor measured using a variable voltage or current source, or related parameters inferable from subthreshold transistors or circuits containing one or more transistors operating sub-threshold. Tamper proofing may include methods to detect stress or strain in at least a component of the device, utilizing in non-limiting examples microelectromechanical system (MEMS) elements, piezo electrics, quantum tunneling diodes, or any other instantiation that provides an electrical output depending on stress or strain. Further, the device may integrate wavelength sensitive detectors, e.g. to detect the use of focused ion beam, X-ray, or other destructive or nondestructive methods of measurement of physical properties.

As a further non-limiting example, and still referring to FIG. 2, fabrication of at least a non-analyzable circuit element 212 may include fabrication of at least a circuit element having an output unpredictable by circuit analysis. For instance, and without limitation at least a non-analyzable circuit element 212 may include metastable elements, such that it is not possible to predict the circuit behavior from a plan of the circuit, without electrically probing the circuit. Fabrication of at least a non-analyzable circuit element 212 may include fabrication of a circuit element denatured by probing; for instance, one or more instances or subsections of the circuit may be disposed within a three-dimensional chip in a form that makes it infeasible to probe with drilling and/or thinning via chemical-mechanical polishing, grinding, etching or the like, or slicing the chip, and so arrayed that drilling and/or slicing and/or thinning via chemical-mechanical polishing, grinding, etching or the like will destroy the circuit sufficiently to make module-specific secret impossible to recover. Such subsections or instances may include features that are highly vulnerable to fracture under processes used to expose or probe circuit elements, such as chemical mechanical polishing, etching, or the like. In an embodiment, as a non-limiting example, removal of a first layer of a chip containing non-analyzable circuit element may destroy a second layer disposed beneath first layer, for instance by introducing one or more fragile elements that will shatter or crack when chip is exposed to grinding, or one or more regions, pockets, or veins of material that chemically reacts strongly and/or exothermically to etching chemicals. Alternatively or additionally one or more shielding materials may be disposed on an exterior portion of non-analyzable circuit element 212; shielding materials may have a composition that resists analysis and/or penetration. In an embodiment, shielding materials may be adhered to non-analyzable circuit element 212 with a sufficiently strong adhesive to prevent removal without destruction of the non-analyzable circuit element 212.

Alternatively or additionally, at least a secret generator 204a-b, subcomponents thereof, and/or at least a non-analyzable circuit element 212 may be integrated directly into an integrated circuit (IC) containing other circuit components, including without limitation other circuit components as described herein; this may be implemented, in non-limiting examples, as contiguous functional block within the 3D space of the IC, and/or with fingers interdigitating other logic blocks in the IC, and/or as multiple distinct functional blocks wired together electrically, such that it is infeasible to electrically probe the outputs of at least a secret generator 204a-b via man in the middle or other attacks.

In an embodiment, and with continued reference to FIG. 2, fabricating at least a secret generator 204a-b and/or fabrication of at least a non-analyzable circuit element 212 further may include fabrication of an element that performs a PUF 216. One or more PUFs 216 may be implemented by various means. In an embodiment, fabrication may include fabrication of elements implementing non-intrinsic PUFs. Non-intrinsic PUFs may include without limitation optics based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), microchannel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 2, light sensor may include one or more devices for altering or otherwise affecting light arriving at light sensor. Such devices may include attenuators, which may include any element usable to attenuate a photon stream. Devices may include optical deflectors, including without limitation an acousto-optic deflector; an acousto-optic deflector, also known as an acousto-optic modulator (AOM), is defined herein as a device that modifies power, frequency, or direction of a photon stream in response to an electric signal, using the acousto-optic effect. The acousto-optic effect is an effect whereby the refractive index of a material is modified by oscillating mechanical pressure of a sound wave; the material may include, without limitation, a transparent material such as crystal or glass, through which the light passes. As a non-limiting example, material may be composed in least in part of tellurium dioxide ($TeO_2$), crystalline quartz, fused silica, and/or lithium niobite; the later may be used both as material and as piezoelectric transducer. A soundwave may be induced in the material by a transducer, such as a piezoelectric transducer, in response to an electrical signal; soundwave may have a frequency on the order of 100 megahertz. Frequency and/or direction of travel of refracted light may be modified by the frequency of the soundwave, which in turn may be modified by the electrical signal. As a result, light may be redirected, filtered for frequency, or both as controlled by the electrical signal, enabling acousto-electric deflector to direct a photon stream through a sweep analogous to the sweep through which photocathodes are direct through in a conventional streak camera. Intensity of the transmitted photon stream may further be controlled by amplitude of the sound wave, enabling acousto-optic deflector to vary frequency, direction, and/or intensity of transmitted light. AOM may alternatively or additionally be referred to as a Bragg cell or Bragg grating. Soundwaves may be absorbed at edges or ends of material, preventing propagation to nearby AOMs and enhancing the variability of the induced soundwaves as directed by electrical signals. In addition to by Bragg gratings/AOM, redirection or modulation of photons may be accomplished using apodized gratings, complementary apodized gratings or elements. Optical deflector may receive an electrical signal from an optical deflector circuit, which may be operated by or included in a control circuit as described in further detail below.

As noted above, light sensors may be biased to a point at which a single photon triggers detection, for instance by triggering an avalanche in an APD. Bias may alternatively be set to require a higher threshold for detection and/or to present some finite gain, such as linear gain; in either case, detection may indicate a certain level of intensity and/or energy in the received signal. Threshold intensity may be combined with one or more other signal detection parameters; for instance, a photon detector may be configured to trigger at a given wavelength and/or angle of incidence, and intensity level, such that only light of a particular wavelength and/or angle of incidence at a particular degree of intensity registers as detected. Intensity level may be used to cancel noise in some embodiments; that is, an expected kind of noise, or a kind of noise previously detected by performing one or more detection steps as disclosed herein, may have an intensity below a given threshold, while a desired signal may have an intensity above that threshold, so that setting the intensity threshold may eliminate noise and improve resolution, at least at a particular other parameter such as wavelength and/or detection angle.

Still viewing FIG. 2, light sensor may include at least a device that modulates or affects a signal received at light sensor. For instance, two or more detectors of light sensor may be arrayed in close proximity to each other, with the detectors made sensitive to differing ranges of incident angles. For example, two or more detectors may utilize a diffraction grating to implement incident angle sensitivity. In this scenario, at least three phase ranges may be implemented to reconstruct a three-dimensional view, with averaging over the three nearest phase range detectors to obtain amplitude. Alternatively or additionally, angle sensitivity may be achieved using micro lenses on each detector, or by any other suitable means; persons skilled in the art, upon reading the entirety of this disclosure, will be aware of various elements and techniques for filtering or limiting the angle of incidence of detected signals.

Continuing to view FIG. 2, light sensor may include one or more optical elements causing light sensor select specific wavelengths of light, either statically or dynamically, e.g. to restrict the fraction of photons arriving at the sensor that arise from ambient light instead of reemitted source photons (via acousto-optical modulator, fixed wavelength sensitive filter, or other, singly or in combination). Alternatively or additionally, different wavelengths may be utilized to discriminate modulation of reemitted photons by wavelength sensitive absorbers (e.g. oxy- vs deoxyhemoglobin, fluorophores etc) from modulation of reemitted photons by structural components, or other. Light sensor may incorporate wavelength-sensitive masking or other means to spectrally tune the sensitivity of a particular detector to a given range of wavelengths, with peak wavelength sensitivity of the two or more detectors spaced sufficiently far apart to discriminate center wavelength for the given photon count of the desired system. As a non-limiting example, if many photons are counted in aggregate, the standard deviation of the wavelength range may be higher such that the closest two distributions overlap, but sufficient photons are detected to discriminate the two.

With continued reference to FIG. 2, optical elements may perform various other functions or combinations thereof. As a non-limiting example, optical elements may serve the purpose of attenuating intensity of incident photon flux (via variable optical attenuator, neutral density filter or other), e.g. to titrate the total number of photons arriving at detectors 104*a-b* per unit time to avoid saturation; for instance, in a pure time of flight approach, as described in further detail below, the number of photons arriving at the detector may be titrated via optical filters (wavelength selective to minimize saturation by ambient light, and/or amplitude filtering to allow only a fraction of total photon flux through, among others). Light sensor may be electronically gated (in case of SPAD, SiPM and others) to avoid detection of superficially reflected photons. Optical elements may serve to modulate the sensitivity of light sensor to polarization; for instance, and without limitation, optical elements may include one or more polarizing filters. Optical elements may serve to modulate the sensitivity of detector 104*a-b* to incident angle. Optical elements may include an optical gate; for instance the optical path between the light sensor may be intermediated by an optical gate to eliminate or minimize photon arrival at the light sensor while the light sensor is resetting, either to reduce detector-originated jitter, after-pulsing or other effects. In one example, the gate may include an AOM. In another example, the gate may include an electro-optical modulator. In a further example, the gate may include an optical Kerr effect gate. An AOM may be used to modify intensity of transmitted light and/or frequency. In the case of modification of frequency of transmitted light, control circuit, as described in further detail below, may account for an expected shift in direction of transmitted light as resulting from frequency modulation of a soundwave to adjust the frequency of transmitted light. Optical elements may alternatively or additionally include apodized gratings, complementary apodized gratings, fiber Bragg gratings, or the like.

Continuing to view FIG. 2, optics based PUF may include an emission source of light and/or photons, such as a laser, LED, or gated photon emission source. One or more pulses of light may include pulses of a specific wavelength; pulses may be coherent or diffuse. Specific wavelength may be in a diffusive range including without limitation the diffusive range of 500-1500 nanometers. At interfaces between media with differing indices of refraction, light may be back reflected and/or reemitted, absorbed, or transmitted deeper into the sample at an angle described by the differences in index of refraction. Alternatively or additionally, source of photons may be a fluorophore, quantum dot, nitrogen vacancy in diamond, other lattice vacancies, or other natural or engineered structure that changes optical properties in response to changes in environment. In such applications, a source of photons to be detected may be excited either by a different wavelength of light, by a change in concentration of an ion, e.g. Ca2+, Mg2+, K+, NA+, by a change in pH, or by some other means, including without limitation matter/antimatter interaction.

Still referring to FIG. 2, circuitry connected to or incorporated in an optics-based PUF may perform various processing steps to convert a received optical signal or pattern into an electrical signal usable as at least a module-specific secret. Such processing may include without limitation Fourier analysis of received signals, for instance to determine patterns of received wavelengths; patterns of received wavelengths may be used, as a non-limiting example, to generate a digital output based on received optical signal. For instance, predominating signal frequencies may correspond to high binary values while suppressed signal frequencies may be converted to low binary values. Optical signal values may be assessed by a binning procedure to permit consistent outputs despite minor variations in optical signals; thus, for instance, a light sensor array detecting a scattering pattern may treat slightly variant detected light positions as falling into the same "bin," representing a pixel area of a certain length and width, or other range of distances about a point. Similarly, where a signal to be produced from optical signal depends on a pattern of frequencies, wavelengths, or amplitudes, a range of each such value may correspond to a particular "bin" associated with a particular output bit. Binning may be used to produce consistent outputs which nonetheless depend on random variations in optical signal. In an embodiment, binning may be used to create a consistent output from any signal pattern in any PUF that functions by detecting a signal or converting an analog signal to another analog signal or to a digital signal, as described in further detail below.

With continued reference to FIG. 2, scattering medium may be fabricated, for instance, by doping a transparent material with scattering particles, and incorporating a light source that whereby interaction between light source and material causes a unique speckle pattern. Scattering particles may be introduced in an uncontrolled process. Scattering medial may include paper; for instances, scattered light may be generated by for instance reflection or scattering of a focused laser beam from the irregular fiber structure of paper. This approach may alternatively or additionally be used with any substance having a sufficiently unpredictable effect on light or electromagnetic radiation, such as any diffusive substance, including various biological substances. Alternatively or additionally, manufacture of optics-based PUFs may include fabrication of phosphor PUFs, or PUFs incorporating or exploiting any other fluorescence-based substrate, for instance by introducing a random blend of small phosphor particles into the bulk of a device or its surface; the subsequent phosphorescent pattern may be the unique identifier.

Still referring to FIG. 2, fabrication of non-intrinsic PUFs may include without limitation fabrication of radio frequency (RF)-based PUFs. This may be accomplished, as a non-limiting example, by embedding thin, randomly arranged copper wires in flexible silicone sealant or other RF permissive medium, and incorporating in at least a secret generator 204a-b a source of electromagnetic waves, which may, in a non-limiting example, emit in the 5-6 GHz band; near-field scattering of such waves may be detected, for instance, using a matrix of antennas incorporated in at least a secret generator 204a-b to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate module-specific secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

Still viewing FIG. 2, fabrication of non-intrinsic PUFs may include without limitation fabrication of electronics based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)- based PUFs. N For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 2, fabrication of one or more PUFs 216 may be accomplished as part of a semiconductor circuit production, resulting in fabrication of an "intrinsic PUF"; semiconductor construction may include without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

Still referring to FIG. 2, fabrication of intrinsic PUFs may include fabrication of asynchronous PUFs, which may be synonymous with Self-Timed Ring PUFs. This may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 2, fabrication of one or more PUFs 216 may include fabrication of a circuit producing a PUF via cross-connected logical or analog circuit elements. As a non-limiting example, static random-access memory 256 (SRAM) PUFs may be fabricated by fabricating and/or cross-coupling two inverters and two access transistors. When the cell is powered up, the two cross-connected inverters may enter a "power-struggle," where the winner is decided by the difference in the driving strength of the MOSFETs in the cross connected inverters. Theoretically, there are three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-connected NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other PUFs 216 may be fabricated similarly, including buskeeper PUFs, which may be similar to other PUFs based on bistable memory 256 elements, but leveraging buskeeper cells. Fabrication may also combine two or more PUF designs, for instance by creating bistable ring PUFS as a hybrid of the ring oscillator PUF and the SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 1, fabrication of PUFs 216 may include production of mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 2, constructing a PUF 216 may include fabrication of a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 2, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AlAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode based PUFs.

Continuing to refer to FIG. 2, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUT response due to local variations in temperature and magnetic field; such changes would be unknown to an attacker and may enable the production of multiple unique IDs based on such f actuations, in a manner unpredictable even to the manufacturer.

With continued reference to FIG. 2, other elements or components may be used instead of or additionally to RIDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204a-b. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 2, other applications of other types of PUB, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 2, PUB 216 may include, without limitation, PUFs implemented using design of VIAS, as defined above. A "VIA-PUT" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUFs 216 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe microcavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 2, other examples of PUFs 216 that may be used may include, without limitation, nano electromechanical (NEM) PUFs. NEM PUFs may include PUFs that leverage stiction of a silicon nanowire to a binary gate structure. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLM) PUFs, which may use KLJN key exchange to generate, between two hardware components, a new and manufacturer-unknown secret key which may be stored locally in, for instance, secure hash memory.

With continued reference to FIG. 1, PUFs may be configured to have tamper-proofing elements which may include sensing of changes to temperature that could indicate attempts to remove a component via de-soldering or related. In a non-limiting example PUF architectures may be utilized to establish a device or machine "fingerprint" indicating that the device is currently or has at some point in the past been exposed to temperatures indicating potential tamper attempts. In an example, a PUF or series of PUFs may be generated intentionally with some temperature, stress/strain, or other variation sensitivity. In non-limiting example, in an SRAM based PUF, variations in temperature may shift the response of a given cell from a one to a zero or vice versa. Such a device or series of devices may be exposed to such variations in a post-manufacturing configuration step, and device keys may be generated at one or more points of variation of these parameters, and their resulting keys, hashes thereof, or via other recoverable but obfuscating method, e.g. fuzzy extractor method as described herein, securely stored. The device may periodically, either via pre-programmed function, probabilistically, or in response to heuristics suggesting possible tampering, compare the output of such one or more PUFs to the hashed values at or trending towards the extremes of such variations, and use the resulting comparison to take one or more actions to counter, mitigate the effects of, or alert other devices or components to potential tampering.

Still referring to FIG. 1, one or more elements of apparatus 100, including without limitation at least a secret generator module 104a-b, PUFs 116, and/or any other element or component introduced herein, may be implemented in programmable logic devices, for example one-time programmable hardware components such as field programmable gate arrays (FPGAs) using one or more semiconductor process dependent variation-based techniques as listed above. In general, approaches to implement PUF 116 in FPGA may include multi-step approaches in which device specific information, e.g. signal delay, aging, temperature dependence and the like may be first extracted and subsequently device specific placement of the PUF may be configured. PUF 116 may be configured to perform autonomous majority voting with or without orchestration by a clock. PUF 116 may be an Anderson PUF using look up tables (LUTs) and hardened carry chains. IMF 116 may further derive device specific VLF from Anderson PUFs, e.g. by using two or more adjacent SLICEM blocks in which the LUTs are used as shift registers. As described above, PUF 116 may be used to create device specific temperature specific fingerprints.

Still referring to FIG. 2, at least a secret generator 204a-b may be configured to output a plurality of bits as a function of the module-specific secret. In an embodiment, where module-specific secret is output from one or more PUFs 216 and/or hardcoded key generation circuits, this may be accomplished by outputting one or more bits directly from the PUF 216 and/or key generation circuit; in embodiments connecting at least a secret generator 204a-b to other elements according to secret sharing, oblivious transfer, or secure multiparty computation protocols, one or more outputs from PUF circuit and/or hardcoded key generation circuit may connect to a circuit to generate outputs according to such protocols, as described in further detail below.

Still viewing FIG. 2, secure computing hardware apparatus 200 may include a key extractor 220 connecting at least a secret generator 204a-b to one or more additional elements of secure computing hardware apparatus 200. Key extractor 220 may be incorporated in secret generator; for instance, key extractor 220 may convert immediate output from PUF 216 into key in the form of a binary number. Key extractor 220 may include, without limitation, a fuzzy extractor, such as those used to convert slightly variable signals from biometric samples or the like predictably into keys by having certain variation tolerances in the binary encoding process. Key extractor 220, as a further example, may include a key extractor 220 physically unclonable function. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Key extractor 220 may extract a symmetric key; for instance, key extractor 220 may extract one or more random numbers based on at least a module-specific secret to create a symmetric key as described above. Key extractor 220 may alternatively or additionally extract a private key of a public key cryptographic system. Key extractor 220 may be communicatively connected, as defined below, to any component, module, or circuit incorporated or included in secure computing hardware apparatus 200, including without limitation at least a secret generator 204a-b and/or a device identifier as described in further detail below. In an embodiment, private key, whether produced by key extractor 120 or any other module or component described herein, may never be stored in memory. For instance, private key may be used solely as an input to a device identifier, for instance as used to perform a digital signature process as described in further detail below; this may, in a non-limiting example, be used to prevent memory-access attacks such as buffer or stack overrun attacks, speculative execution attacks, or the like from recovering private key, enhancing the integrity of secure computing hardware apparatus.

With continued reference to FIG. 1, PUF 116 may utilize at least a TRNG or other entropy source to provision an N bit secret vector $\vec{s}$ that is hashed via a cryptographic one-way function, in non-limiting example SHA256, SHA3 or the like, to create a seed for a key derivation function (KDF), in non-limiting example ED25519, generating at least a public/private key pair. At least a PUF 116 may, in a non-limiting example, output an M bit vector $\vec{e}$ (or a subset of PUF 120 output is truncated, multiple PUF outputs may be concatenated, or any combination thereof) which, combined with a public M×N bit matrix A and potentially public helper vector $\vec{b}$ satisfies the equation $\vec{b}=A\vec{s}+\vec{e}$. such that PUF output $\vec{e}$ and public helper data $\vec{b}$ and matrix A may be used to regenerate at least a secret $\vec{s}$. In an embodiment, bits of $\vec{e}$ that may be considered unstable or otherwise undesirable for purposes or stable regeneration may be discarded, resulting in associated reduction in length of $\vec{b}$ and A. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Extraction may also include extraction of a symmetric key.

With continued reference to FIG. 2, key extractor 220 may use a number output by secret generator to generate a public and private key pair. For instance, and without limitation, key extractor 220 may use a number output or generated by secret generator as a seed in an elliptic curve cryptographic system. In a non-limiting example, module-specific secret may include a random number generated within a desired interval, which may be achieved, for instance, by setting the number of output bits to be provided from secret generator; steps along a chosen elliptic curve may then be performed using random number to generate a public key. Initial point on elliptic curve and elliptic curve may be selected using additional random numbers, which may be generated using any suitable method; key extractor 220 may discard random numbers associated with curves having known vulnerabilities, which may be provided to key extractor 220 in memory 256. Persons skilled in the art, upon reading the entirety of this disclosure, will be aware of various ways in which a random number may be used to generate a private and public key pair consistently with this disclosure. Key extractor may utilize a numerical output from at least a secret generator 204a-b to generate an RSA private key; this may be accomplished, for instance, by using numerical outputs from at least a secret generator 204a-b to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. At least a secret generator 204a-b may generate one or more random numbers, for instance by using one or more PUFs 212 as described above; key extractor 220 may use any suitable algorithm for generating a prime from a random number to produce pairs of primes usable as RSA factors. Key extractor 220 may discard random numbers below a threshold size and may perform other filtering processes to discard potentially insecure prime factors. Persons skilled in the art, upon reviewing the entirety of this disclosure, will be aware of many suitable methods for creating RSA primes, and using such primes to generate RSA keys, using random numbers output by at least a secret generator 204a-b.

Still referring to FIG. 2, manufacture of secure computing hardware apparatus 200 may include fabrication of one or more separate integrated circuits; one or more separate integrated circuits may instantiate one or more PUFs 216 and associated circuitry to generate upon request a private hardware key incorporated therein. In an embodiment, one or more PUFs 216 generate a random number seed of a private key, as described in further detail below. In an embodiment, at least a secret generator 204a-b includes at least a first secret generator having at least a first secret share of the module-specific secret and at least a second secret generator having a second secret share of the module-specific secret. A secret share, as defined herein, is a portion of module-specific secret that may be combined with at least one other such secret share to produce module-specific secret, but which is insufficient by itself to determine overall module-specific secret. At least a first secret share and at least a second secret share may be combined to create module-specific secret only upon production of output by at least a first secret generator module and at least a second secret generator module; in other words, each module may be manufactured separately in any form described herein, with or without manufacturer knowledge of its eventual output, and the outputs, when assembled, may be combined as secret shares to produce module-specific secret. Each of at least a first secret generator module and at least a second secret generator module may be manufactured or produced by a different entity, and subsequently combined to produce at least a secret generator module 104a-b; as a result, no one manufacturer may be in a position to discover module-specific secret, while each such manufacturer may be capable of verifying authenticity of a secret share generated by that manufacturer's secret generation module, a proof based thereon, or the like.

With continued reference to FIG. 2, at least a secret generator 204a-b may include a one-time secret generator, defined herein as a secret generator designed to generate a single secret. One-time secret generator may, as a non-limiting example, generate a single response to a single challenger of a challenge-response pair. As a further example, one-time secret generator may generate a single private key and/or a number usable to generate a private key, for instance via a key extractor. One-time secret generator may include a disposable element; for instance, one-time secret generator may include a disposable card or physical sample, such as a piece of paper to use in an optical or paper based PUF, a set of wires embedded in silicon for use in an RF PUF, or the like. One-time secret generator may include a circuit incorporating one or more PUFs as described above. Secret generator may limit the number of challenge-response inquiries allowed in a period of time, in total, or from a specific requestor to mitigate brute force attacks. Secret generator may require that the requestor provide collateral, e.g. in assets or resources, to discourage brute force attacks. Secret generator may require at least a secure datum to authorize requestor to be able to challenge secret generator for a response.

Still referring to FIG. 2, secret generator 204a-b may be designed and configured to have its manufacture completed and/or to complete its own manufacture upon an initial boot-up; that is, the first time power is provided to secret generator 204a-b, secret generator 204a-b, a circuit connected thereto, and/or a circuit incorporated therein may further modify secret generator 204a-b to create module-specific secreta and/or to enable secret generator 204a-b to output module-specific secret. The first-time power is provided to secret generator 204a-b may include a wafer test or other stage of manufacturing for one or more components of secure computing apparatus 200 and/or other hardware elements, such as a system on chip (SoC) containing secure computing apparatus 200 and/or one or more modules thereof. In an embodiment, processes of completing an ability of a secret generator 204a-b to generate and/or output module-specific secret, which may be described herein as "root key origination," may be effected via PUF circuitry, whereby output of secret generator module 204a-b is not predictable prior to first power-up. Process of root key origination may alternatively or additionally include activation of one or more one-time programmable and/or sampled circuit elements, such as mask ROM, one-time programmable fuses, and/or a one-time sampled entropy source, such as without limitation a TRNG, the output of a Zener diode calibrated to remove DC offset, or the like; such a one-time programmable and/or sampled circuit may be automatically programmed and/or sampled on first power up by activation of a circuit that performs activation, for instance by providing voltage and/or current to one-time programmable fuses that connect together elements of a PUF, initially disconnected circuit elements of any kind in secret generator module 204a-b, and/or one or more circuit elements to output paths 208 or 240. Alternatively or additionally, one-time programmable and/or sampled circuit may be connected externally and/or manually, or given manual instruction or intervention beyond provision of power at power sources of secret generator 204a-b; for instance, a manufacturer and/or automated manufacturer may enter commands at one or more command ports sampling and/or programming one-time programmable and/or sampled circuit, which may include activation and/or programming of a state machine, such as an irrevocable state machine, as described in further detail below.

Still referring to FIG. 2, root key activation may alternatively or additionally include a physical unsealing process, whereby a person and/or manufacturing device adds a previously unconnected conductive path within and/or to secret generator module 204a-b to complete manufacture thereof and/or connect secret generator module 204a-b to other components; as a non-limiting example, wafer construction may include construction of a "buried" lead or hole that is covered, for instance, by SO2 or other insulating material that must be abraded or drilled away to effect a connection.

In an embodiment, and still referring to FIG. 2, root key activation at given stage in a manufacturing process may enable use of root keys to certify all subsequent steps of the manufacturing process, such as wafer testing, die sorting, packaging, testing of packaged silicon, OEM assembly or the like; certification may include signing and/or otherwise verifying automated manufacturing instructions and/or steps using attested computing as described in further detail in this disclosure. After the secret generator 204a-b, a secure computing apparatus 200 incorporating at least a secret generator 204a-b, and/or other module, SoC, device or the like incorporating any such element is integrated into a product, the same root keys may be available to secure OTA updates, attested computing processes, or the like. Above-described approaches to root key activation and/or origination may minimize a threat surface for these valuable keys to be leaked or extracted; such keys may not traverse a network or interface, and they cannot be stored by the manufacturer. In an embodiment, where an honest but curious manufacturer is assumed, effort to circumvent the above-described root key activation and/or origination processes may be overly effortful, infeasible, and/or impossible, ensuring secrecy of root keys and/or module-specific secrets so instantiated; as noted above, module-specific secrets may be unique to each secret generator 204a-b, which may further enhance security thereof when combined with the above-descried root key origination and/or activation processes.

Referring again to FIG. 1, at step 110, method 100 includes receiving a device identifier. Referring again to FIG. 2, device identifier 224 is configured to produce at least an output 208 comprising proof of the module-specific secret. Device identifier 224 may include a hardware module, a software module, and/or a combination of hardware and software. For instance, and without limitation, device identifier 224 may be a hardware-only device identifier circuit. Device identifier 224 may include a programmable module that may be programmed to perform one or more logical and/or computational steps as described in this disclosure; programmable module may include a one-time programmable module such as an FPGA or ROM, or may include a module programmable through software and/or firmware as described in further detail below. Device identifier 224 may combine hardcoded logic circuitry with one or more programmable modules. A proof, as used herein, is any element of data that demonstrates possession of the module-specific secret. Proof may include a secure proof of the module-specific secret. A secure proof, as used herein, is a protocol whereby an output is generated that demonstrates possession of a secret, such as module-specific secret, without demonstrating the entirety of the module-specific secret; in other words, a secure proof by itself, is insufficient to reconstruct the entire module-specific secret, enabling the production of at least another secure proof using at least a module-specific secret. Where at least a module-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a module-specific secret, for instance as used in a single challenge-response exchange.

Continuing to view FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and still referring to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still viewing FIG. 2, in an embodiment, secure proof is implemented using a challenge-response protocol. In an embodiment, this may function as a one-time pad implementation; for instance, a manufacturer or other trusted party may record a series of outputs ("responses") produced by at least a secret generator 204a-b, such as without limitation outputs of one or more PUFs 216, given a series of corresponding inputs ("challenges"), and store them securely. Authentication may be performed by receiving, by the secure computing hardware apparatus 200 an input, generating, using the device identifier 224, a response using the secret generator, and outputting, via the device identifier 224, the response. Trusted party having stored challenge-response pairs may then compare response to stored pairs to verify the identity of secure computing hardware apparatus 200; the input may be discarded from future use to prevent spoofing by possible eavesdroppers. In an embodiment, a challenge-response protocol may be combined with key generation; for instance, various inputs to at least a secret generator 204a-b and/or at least a PUF 216 may elicit various outputs, each of which may be used to generate a different key using, for instance, key extractor 220. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a module-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 2, secure proof may include a digital signature protocol. A digital signature as used herein is an application of a secure proof of a secret possessed by a particular device and/or user thereof to an element or lot of data, or to a verifiable mathematical representation of the element or lot of data, which may include a cryptographic hash as described above. A digital signature may include, without limitation, an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In an embodiment, and continuing to refer to FIG. 2, a digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Provisional Application No. 62/815,493, filed on Mar. 8, 2019, and entitled "METHODS AND SYSTEMS FOR IMPLEMENTING AN ANONYMIZED ATTESTATION CHAIN," the entirety of which is incorporated herein by reference.

Still viewing FIG. 2, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 2, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing hardware apparatus as described in further detail below; in such scenarios, authentication may include proof by the secure computing hardware apparatus that the secure computing hardware apparatus possesses a secret key to a public key/certificate pair.

Still viewing FIG. 2, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

With continued reference to FIG. 2, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective. At least a module-specific secret, or a datum derived therefrom, may be used as at least a random number to seed and/or pad one or more hashing algorithms.

Still referring to FIG. 2, secure proof may take any other suitable form used in cryptographic systems to demonstrate possession of secret information including without limitation any information that may be used as or derived from at least a module-specific secret. Such forms may include, for instance, digital fingerprints, watermarks, credentials such as passwords or the like, tokens or any other suitable object that may be exchanged or output to furnish a secure proof.

With continued reference to FIG. 2, device identifier 224 may include at least an exterior input terminal 228 receiving information from another process or component, including without limitation a processor 260 incorporated in secure computing hardware apparatus 200, an input port to secure computing hardware apparatus, a connection to a network or to a remote device, or the like. Device identifier 224 may include at least an exterior output terminal 232 outputting information to another process or component; device identifier 224 may be configured to receive an input, such as a challenge or datum to be digitally signed, via at least an exterior input terminal 228, and to produce a secure proof output via the at least an exterior output terminal 232. Device identifier 224 may include at least an interior input terminal 236 receiving at least an input from at least a secret generator 204a-b as a function of module-specific secret. Device identifier 224 may include at least an interior output terminal 240, which may connect device identifier 224 to at least a secret generator 204a-b, for instance submitting an input that triggers at least a secret generator 204a-b to produce an output to at least an interior input terminal 236.

With continued reference to FIG. 2, fabrication of device identifier 224 may include fabrication of a hard-coded process for producing secure proof. For instance, a logic circuit may be constructed that signs a digital signature, which may be performed using a private key generated by at least a secret generator 204a-b. As a non-limiting example, device identifier 224 may include a logic circuit that receives as inputs from at least an exterior input terminal 228 an element of data to be signed using a digital signature and an input from at least a secret generator 204a-b via at least an interior input terminal produced as a function of at least a module-specific secret, and output via at least an external output terminal a digital signature signing the element of data using a private key derived using the input from the at least an internal input terminal. This circuit may be simulated on a computing device and then fabricated; simulation and fabrication may be performed according to any process described herein.

Still referring to FIG. 2, in an embodiment device identifier 224 and/or key extractor 220 may be constructed with one or more tamper-proofing or obfuscation techniques to defeat invasive or non-invasive analysis thereof. This may be accomplished using any means or method suitable for the generation of at least a non-analyzable circuit element 212 as described above.

Referring again to FIG. 1, at step 115 method 100 includes communicatively connecting device identifier 224 to at least a secret generator 204a-b. As used herein, "communicative coupling" is a process whereby one device, component, or circuit is able to receive data from and/or transmit data to another device, component, or circuit. In an embodiment, communicative coupling includes electrically coupling at least an output of one device, component, or circuit to at least an input of another device, component, or circuit; for instance, communicative coupling may be performed in an embodiment by connecting at least an output 208 of at least a secret generator 204a-b to at least an internal input of device identifier 224. Communicative coupling may be further accomplished by connecting at least an input to secret generator to at least an internal output of device identifier 224. Communicative coupling may further be performed by creating an optical, inductive, capacitive, or other coupling between at least a secret generator 204a-b and device identifier 224. Communicative coupling may include placing at least a secret generator 204a-b and device identifier 224 in near-field communication with one another. Communicative coupling may include configuring at least a secret generator 204a-b and device identifier 224 to send and/or receive signals between at least a secret generator 204a-b and device identifier 224. Communicative coupling may include direct or indirect coupling; for instance, at least a secret generator 204a-b may be communicatively connected to device identifier 224 by way of an intermediate circuit, such as without limitation a key extractor 220 as defined above. Communicative coupling may be performed via a bus or other facility for intercommunication between elements of a computing device as described in further detail below in reference to FIG. 6. Communicative coupling may include fabrication together on a shared integrated circuit and/or wafer; for instance, and without limitation, one or more secret generators of at least a secret generator 204a-b and device identifier 224 may be combined in a single monolithic unit or module.

With continued reference to FIG. 1, communicative coupling may further be performed according to one or more protocols for generation of secure proof. For instance, in an embodiment, one or more computations performed to produce secure proof may be performed using a secure multiparty computation (SMC) protocol. An SMC protocol, as used herein, is a process whereby at least two parties, which may be devices furnishing inputs such as binary inputs, provide inputs to a process that performs a calculation using the inputs to produce a result; each set of inputs is based on a secret possessed by the corresponding party. If each party to a secure multiparty computation submits its inputs according to an assumed set of protocols, then neither party nor any observer to the process can deduce either secret, even given the circuit performing the calculation and both sets of inputs. Inputs may be provided to circuit using, for instance, oblivious transfer protocols, wherein party providing input provides a secret share based on secret to the circuit without being in a position to determine which secret share has been provided. Exemplary secure multiparty computation processes include without limitation the Yao's Garbled Circuits solution to the "millionaire's problem";

persons skilled in the art, upon reviewing the entirety of this disclosure, will be aware of various protocols for implementation of secure multiparty computation that may be applied to perform secure proof as described herein.

Referring again to FIG. 2, in an embodiment fabrication of device identifier 224 may be performed by producing a circuit that performs secure multiparty computation; circuit may be produced by first simulating a circuit to perform secure proof, then transforming the circuit to implement a secure multiparty computation generating the same secure proof. In an embodiment, transformation further includes transformation of input terminals, such as at least an exterior input terminal 228 and/or at least an interior input terminal 236 to furnish inputs to the secure multiparty computation circuit. In an embodiment, a first oblivious transfer circuit 244 connects at least a secret generator 204a-b to at least an interior input terminal 236. First oblivious transfer circuit 244 may include any tamper-proofing as described above. A second oblivious transfer circuit 248 may connect to at least an exterior input; second oblivious transfer circuit 248 may, for instance, perform an oblivious transfer of secret share inputs based upon at least a datum to be digitally signed, or at least a challenge provided pursuant to a challenge-response protocol. In operation, inputs from at least a secret generator 204a-b and inputs via at least an exterior input may be combined within device identifier 224 to produce the secure proof via at least an exterior output. As a result, the ability to determine inputs to device identifier 224, and the ability to prove proof-generation circuit, may still not be sufficient to determine module-specific secret. The input production may further be divided between two or more secret generators of at least a secret generator 204a-b, such as two PUF circuits as practical for ideal production and security thereof, and/or may be divided between two or more categories of PUF.

Still Viewing FIG. 2, Device Identifier 224 may be configured to perform a direct anonymous authentication (DAA) protocol. In an embodiment, DAA is an anonymous digital signature scheme, which instead of reliance on a certificate authority to link a particular private key to a particular party, uses reference to a group public key or to multiple public keys to verify an anonymous signature. Device identifier 124 may act as a "first signer" of a digital signature, signing with a private key produced from a secret generator module as described above, which may be a group key. In an embodiment device identifier 124 signs an element of data using the private key. A second signer, which may include a manufacturer device or another device endorsing key and/or secret used for first signing may previously or subsequently sign the element of data and/or a verification datum associated with the secure proof and/or digital signature used for first signing; alternatively or additionally, second signer may use information or signature elements provided by device identifier 124 and/or at least a secret generator module 104a-b to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof. Similar processes may be performed, such as without limitation Intel EPID. Where a manufacturer or other device signs group public key and/or verification datum, such signature may be provided, distributed to one or more verifying nodes, or the like.

Still viewing FIG. 2, secure computing hardware apparatus 200 may include a verification information circuit 252; verification information circuit 252 may be a circuit that generates additional information that user or device may use to evaluate secure proof. For instance, verification information circuit 252 may generate, as a function of module-specific secret, a public key; public key may be provided automatically to any querying device. Alternatively or additionally, public key may be provided to a manufacturer of secure computing hardware apparatus 200, permitting manufacturer to act as a certificate authority for secure computing hardware apparatus 200. Verification information circuit 252 may be produced using any process or combination or processes for production of any circuit as described above. Verification information circuit 252 may be constructed using tamper-proofing or obfuscation as described above; verification information circuit 252 may use a secure multiparty computation protocol to generate verification information such as without limitation a public key via inputs provided from at least a secret generator 204a-b, as described above. Verification information circuit 252 may be communicatively connected, by any form of communicative coupling as described above, to any other component, module, or circuit of secure computing hardware apparatus 200, including without limitation at least a secret generator 204a-b, device identifier 224, and/or key extractor 200.

Continuing to refer to FIG. 2, in an embodiment, secure computing hardware apparatus 200 may be configured to decrypt encrypted data. For instance, and without limitation, where device identifier 224 includes hardcoded circuits to digitally sign data inputs, such circuits may also function to decrypt cyphertexts encrypted with an encryption key associated with a private or decryption key used to digitally sign data. Alternatively or additionally, further circuits and/or modules may be configured to decrypt cyphertexts using keys generated as a function of at least a module-specific secret and/or other keys Referring to FIG. 1, and by further reference to FIG. 2, at optional step 120, device identifier 224, verification information circuit 252, and/or secret generator may be communicatively connected, as defined and described above, to at least a memory 256. At least a memory 256 may include any memory 256 as described in this disclosure. At least a memory 256 may include, without limitation, one or more elements of read-only memory 256. At least a memory 256 may include one or more elements of execute-only memory 256. At least a memory 256 may include one or more dedicated cache lines or isolated memory 256 modules; for instance, some memory 256 may be accessible only to elements of secure computing hardware apparatus 200. In an embodiment, memory 256, or a portion thereof, may be physically connected only to secure computing hardware apparatus 200; as a result, only secure computing hardware apparatus 200 may be physically capable of accessing memory 256 and/or portion thereof. This may, for instance, prevent attacks wherein a non-secure processor is induced to recover memory entries to which non-secure processor and/or attacker is not authorized access, for instance by using speculative execution race condition exploits, buffer overrun exploits, or the like. Alternatively or additionally, secure computing hardware apparatus and/or a processor of secure computing hardware apparatus and/or connected thereto is further configured to permit a memory access operation to an address in the memory by a requesting processor only after an access privilege operation indicates that the requesting processor has access rights to the address. Thus, for instance, a command to load an item from memory 256 to a register, CPU cache, or the like may be preceded by a process to determine whether requesting process, component, or entity has access to that item; this protocol may prevent exploitation of a race condition whereby memory loading to the register, cache, or other location may precede determination of access rights, enabling adversaries to obtain data to which they do not have access during a window prior to determination that access is denied.

With continued reference to FIG. 2, secure computing hardware apparatus 200 may incorporate electrical isolation functions via active circuitry intended to prevent operations of adjacent logic or control signals from affecting state of elements related to secure processes or computation. For example, a malicious actor may modulate the circuitry adjacent to a sensitive element, for example a key generator or memory cell, and collect information relating to the output of such a sensitive element. Extremely infrequent fluctuations caused by the adjacent activity, for example logic level errors, memory read errors, frequency or other parameter of an analog component, etc., may be detectable with sufficiently large numbers of samples, and from this a malicious actor may obtain information related to the sensitive element, and/or may hinder or tamper with actions of a sensitive element, etc. To prevent such attacks, elements of apparatus 200 such as conductors or semiconductors may be driven with a particular voltage or tied to ground to electrically isolate the sensitive element. This may be done statically or dynamically, including stepwise, random or patterned logic level, or analog sweeps, as a means to obfuscate the neighboring electrical activity. In non-limiting examples, the conducting or semiconducting elements may be metal layers, semiconductors including n- or p-wells, isolation wells, and semiconductor bulk, which may be above, below, and/or adjacent to at least an element related to secure processes or computations, or other operations related to sensitive information. Sensitive elements may include any elements of apparatus 200 including in non-limiting examples processor memory, memory caches, buffers, control signals, sense amplifiers and other analog functions, process flow control elements, e.g. those related to the translation look-aside buffer (TLB), memory page tables, instruction fetches and pre-fetches, and the like.

With continued reference to FIG. 2, secure computing hardware apparatus 200 may electrically isolate sections of memory and/or signal routing via patterning of high impedance dielectric materials, voltage isolation wells in the silicon substrate, selective patterning of metal layers above, below, adjacent to any sensitive element, and configuring the voltage level of such metal layers to obfuscate the electrical behavior of the memory and/or signal routing, as is described above.

Still referring to FIG. 2, secure computing hardware apparatus 200 may be configured to implement one or more secure memory 256 storage protocols. One or more secure memory 256 storage protocols may be protocols designed to prevent unauthorized access to memory 256 and/or to protect secure computing hardware apparatus 200 from attacks compromising memory 256; secure memory 256 storage protocols may prevent, as a non-limiting example, compromise of memory 256 used for computation. In an embodiment, one or more memory 256 elements may be located within a trusted computing boundary (TCB); TCB may be a boundary within which it is physically, information-theo-retically, or computationally infeasible for exterior computing elements to probe, manipulate, access, or otherwise interact with elements under control of or incorporated in secure computing hardware apparatus 200. For instance, and without limitation, it may be infeasible to physically probe the memory 256 or access the memory 256 from other software elements. In some embodiments, one or more memory 256 elements may be located outside of trusted computing boundary. In some embodiments, a memory 256 interface uses algorithmic techniques to randomize memory 256 access patterns, for instance using obfuscated access, oblivious RAM, or ORAM. Such algorithmic techniques may implement one or more randomization techniques. In an embodiment, when crossing a trusted computing boundary, a memory 256 interface data bus may be encrypted; that is data passed to the memory 256 interface data bus may be encrypted using any hardware or software-based encryption techniques discussed in this disclosure. In an embodiment, secure computing hardware apparatus 200 may incorporate a memory 256 controller located within the trusted computing boundary to encrypt and authenticate, by a secret key, memory elements such as without limitation memory page tables and/or memory 256 pages accessible by other software elements, such as an operating system. Various techniques, processes, means or elements may be used to implement the above-described secure memory 256 protocols. For instance, secure computing hardware apparatus 200 may use hardware-enabled access control to protect memory 256 access; hardware access control may, as a non-limiting example, be performed by tagging each memory 256 entry with a "container identifier" corresponding to a page, file, or other grouping of memory 256, enabling secure computing hardware apparatus 200 to determine whether tampering has occurred. Secure computing hardware apparatus 200 may perform one or more safe-sharing protocols for hardware shared with other resources; for instance, where an exception, termination of a programmed process, or other condition causes a secured process to exit, shared registers may be reset to eliminate protected data prior to access by other processes.

With continued reference to FIG. 2, secure computing hardware apparatus 200 may operate using one or more dedicated memory 256 objects, registers, or storage elements; as a non-limiting example, secure computing hardware apparatus 200 may operate with dedicated cache lines not available to other processes or circuits, preventing, e.g., stack or buffer overrun attacks to corrupt or steal data. Dedicated memory 256 elements may be wired only to secure computing hardware apparatus 200; access to dedicated memory 256 elements may be rendered impossible except by way of secure computing hardware apparatus 200. Secure computing hardware apparatus 200 may use one or more order-preserving memory 256 storage protocols to detect "reset attacks" or fraudulent data entries presented out of order; such order preserving memory 256 storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described above, including without limitation blockchains and the like. Secure computing hardware apparatus 200 may utilize oblivious random-access memory 256 (RAM) wherein memory 256 access patterns are obfuscated to prevent detection of memory 256 access patterns by outside observers attempting to deduce execution details regarding processes performed using secure computing hardware apparatus 200. Secure computing hardware apparatus 200 and/or device incorporating secure computing hardware apparatus 200 may incorporate a trusted non-volatile storage device that provides some means of verification of secure storage capability and other properties. Memory 256 protocols as described above may be used to implement methods of attested storage and the chain of trust beginning at PUF level up through processor 260, memory 256 and code. Such mechanisms may be used to secure long-term storage (e.g. solid-state drives (SSDs), spinning disks, tape, other), RAM, or other memory 256 storage facilities. Persons skilled in the art, upon reviewing the entirety of this disclosure, will be aware of various ways in which memory 256 storage, securing, encryption, measuring, and attesting techniques as disclosed herein may be implemented and/or utilized by or with secure computing hardware apparatus 200.

Still referring to FIG. 1, at optional step 125, device identifier may be communicatively connected, as defined and described above, to at least a processor 260. At least a processor 260 may include any processor 260 as described in this disclosure; in an embodiment, secure computing hardware apparatus 200 is incorporated in a computing device, which may be any computing device as described in this disclosure. At least a processor 260 may include a single processor 260 operating independently or may include two or more processors 260 operating in concert, in parallel, sequentially or the like; two or more processors 260 may be included together in a single computing device or in two or more computing devices. At least a processor 260 may be an element of, be in communication with, or otherwise utilize a secure computing hardware apparatus as described below in further detail. At least a processor 260 may be or include a cryptographic evaluator as described below in further detail. At least a processor 260 may be connected to one or more elements of memory 256. At least a processor 160 may be programmed to perform a one-time logic circuit such as field programmable gate array (FPGA) or similar.

With continued reference to FIG. 1, and further referring to FIG. 2, at least a processor 260 may include a secure processor 260. Secure processor 260 may be a processor 260 as described in this disclosure. Secure processor 260 may operate autonomously from other processors 260 and/or an operating system operating on at least a cryptographic evaluator or other device incorporating secure computing apparatus 200; for instance, secure processor 260 may store entries in temporary or long-term memory 256 in encrypted form, where decryption is impossible without private keys not available to devices, circuits or software besides secure processor 260. Encryption may likewise be impossible without private keys available only to secure processor 260. Secure processor 260 may also digitally sign memory 256 entries using, for instance, a private key available only to secure processor 260. Keys available only to secure processor 260 may include keys directly encoded in hardware of the secure processor 260; i.e., a process to digitally sign and/or encrypt using keys may be coded using logic circuits, field-programmable arrays, read-only memory 256, burning into memory 256 using one-time programmable polysilicon fuses, or the like, and thus be immutable absent physical changes to secure processor 260. Secure processor 260 may be constructed to frustrate alteration and/or probing to discover and/or alter private keys. Private keys may be demonstrable as uniquely associated with secure processor 260 by use of secure computing hardware apparatus as described above. Alternatively or additionally, a certificate authority as described above, which may be a manufacturer of secure processor 260, may verify that one or more public keys are associated uniquely with secure processor 260 according to any protocol suitable for digital certificates. Secure processor 260 may include, without limitation, a CPU core, an internal bus, and/or a built-in memory, which may be inaccessible to other processors, including without limitation a non-secure or conventional CPU or other processor of a computing device incorporating secure computing hardware apparatus 200. Writing to memory, where possible, may follow secure memory encryption protocols as described above. In an embodiment, processor 160 may include at least a processor cache, which may include, without limitation, a CPU cache. Processor 160 and/or secure computing hardware apparatus 100 may be designed and/or configured to clear the at least a processor cache after each operation by secure computing hardware apparatus 100; this may prevent a memory-based exploit such as a speculative execution race-condition exploit from accessing ostensibly secure memory retained in the at least a processor cache.

In an embodiment, and still viewing FIG. 1, device identifier 224 and/or at least a secret generator 204a-b may produce one or more modified outputs based on one or more modified parameters. One or more modified parameters may include a modified input to at least one of at least a secret generator 204a-b and/or device identifier 224; for instance, where at least a secret generator 204a-b includes one or more PUFs, it may be possible to produce multiple distinct outputs from the one or more PUFs by modifying inputs to the one or more PUFs, as described for example above. One or more modified parameters may represent passage of time; for instance at least a secret generator 204a-b and/or device identifier 224 may include one or more oscillators and/or timers that may be used to track passage of time; changes in time may be used to generate changes in inputs to at least a secret generator 204a-b and/or device identifier 224. Modified outputs may in turn be used to generate new proofs and/or outputs of verification circuit 252 or the like, according to any method or methods described above.

In operation, and still referring to FIG. 2, secure computing hardware apparatus 200 may be used to authenticate a computing device or other electronic device incorporating secure computing hardware apparatus 200; authentication may be performed, generally, using secure proof as outputted by device identifier 224. For instance, proof-generation circuit may be used to sign one or more digital signatures to be stored in memory 256 of a computing device incorporating secure computing hardware apparatus 200 and/or in a memory 256 of a remote device; digital signature may be stored in a ledger, which may be an immutable ledger. As a non-limiting example, digital signature may be stored in a distributed immutable ledger or audit chain such as a blockchain. Alternatively or additionally secure proof may be used for authentication in a secure communication protocol; for instance, secure proof may take the place of conventional digital certificates in a secure socket layer (SSL) protocol. Secure computing hardware apparatus 200 may be used, in an embodiment, as a trusted platform module (TPM) for any or all TPM-based secure computing protocols; persons skilled in the art will be aware, upon reviewing the entirety of this disclosure, of various ways in which secure computing hardware apparatus 200 may be utilized for secure computing consistently with this disclosure.

With continued reference to FIG. 1, secure computing hardware apparatus 200 and/or at least a processor 260 may implement one or more methods of attested computation. Attested computation may include or involve one or more methods to ensure that computation of a program, known as an attested program, is trusted and signed by secure computing hardware apparatus 200 and/or computing device incorporating secure computing hardware apparatus; this may be supported by means to assert the state of the system memory 256, code, and input data. In an embodiment, secure computing hardware apparatus 200 and/or a computing device incorporating secure computing hardware apparatus 200 computes a cryptographic hash of a system state when performing a trusted computation. System state may include, without limitation, program code and/or one or more elements of data being computed. A resulting cryptographic hash of system state may be stored in one or more trusted or secured memories as described above. Alternatively, hash may be stored insecurely; degree of security used for storage of hash may be established, in a non-limiting example, by system state encrypted in hash. Secure computing hardware apparatus 200 and/or computing device incorporating secure computing hardware apparatus 200 may append a cryptographic signature based upon any private key that may be associated with secure computing hardware apparatus 200 as described herein. Secure computing hardware apparatus 200 and/or computing device incorporating secure computing hardware apparatus 200 may operate a security reset of working memory 256 prior to load of data for trusted computation; for instance, the secure computing hardware apparatus 200 and/or computing device incorporating secure computing hardware apparatus 200 may append a hash of the memory 256 to cryptographic hash of system state following reset and prior to loading data.

Still referring to FIG. 1, secure computing hardware apparatus 200 may be used in a process to create a chain of trust. For instance, one or more parties, which may include secure computing hardware apparatus 200 and/or other devices or components, may sign a hash representing a system state, a computation, a program, one or more elements of memory, or the like. Attested computing processes operating locally or remotely may execute using any such element only if the signature is verified to be correct. Multiple parties to a process or sequence of processes, a set of algorithmic instructions and/or one or more elements of memory may perform digital signatures in a "verifier library" the inspection of which may be usable to determine correctness of one or more computations, states, and/or elements of data. In an embodiment, verifier libraries, signatures, and/or hashes are publicly available; alternatively, sign-in credentials may be required to view, or otherwise interact with, such elements. Secure computing hardware apparatus 200 and/or computing device incorporating secure computing hardware apparatus 200 may append its authentication signature of memory page tables and/or memory 256 tables. Upon completion of the trusted computation, which may include execution of program code of system state, secure computing hardware apparatus 200 and/or computing device incorporating secure computing hardware apparatus 200 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing hardware apparatus 200. Secure computing hardware apparatus 200 and/or computing device incorporating secure computing hardware apparatus 200 may include a system to compute one or more hash trees of cryptographic hash of the computation, system state, and/or outputs; secure computing hardware apparatus 200 and/or computing device incorporating secure computing hardware apparatus 200 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Figure 3:
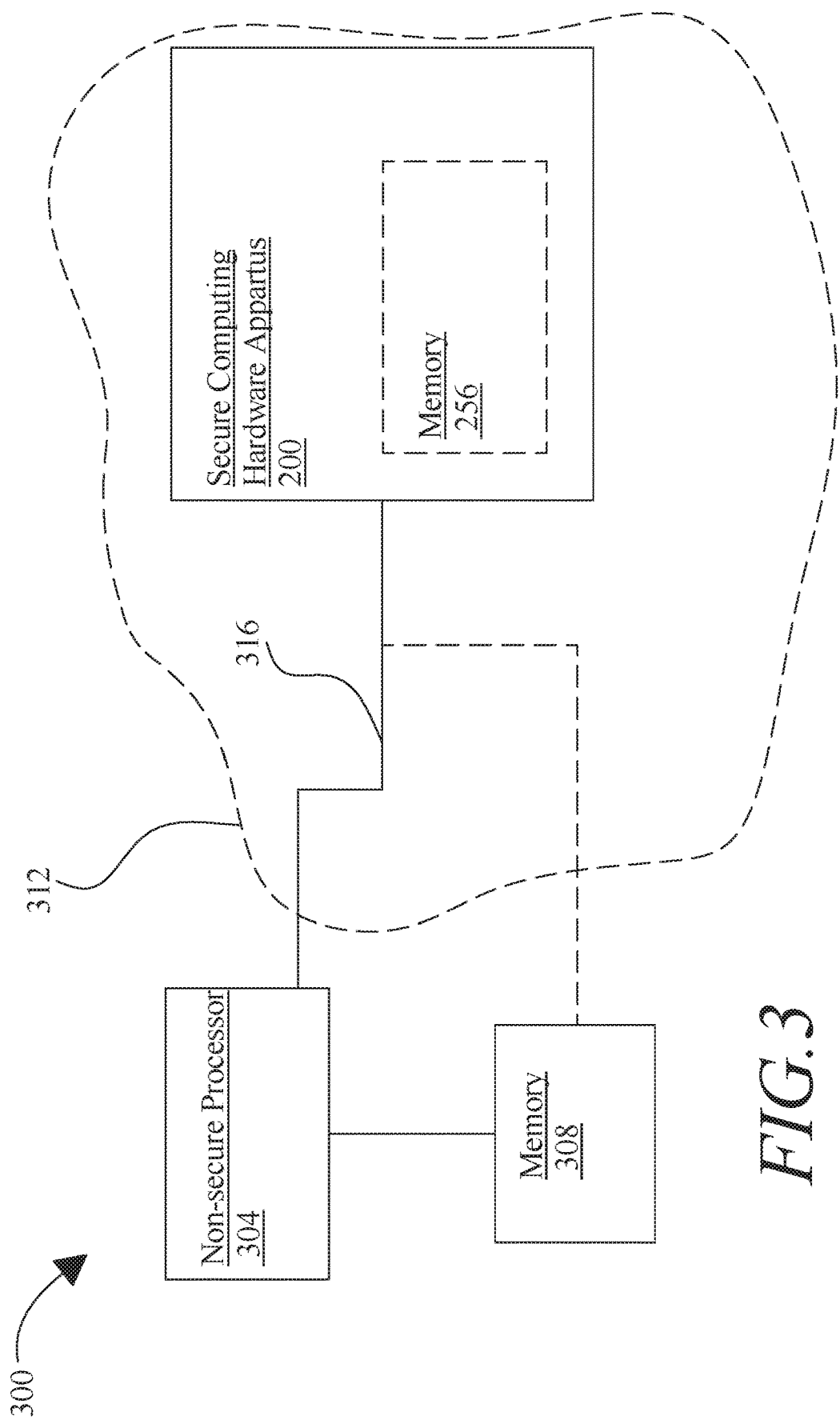
FIG. 3 is a block diagram illustrating an exemplary embodiment of a computing device incorporating a secure computing hardware apparatus.

Referring now to FIG. 3, an exemplary embodiment of a computing device 300 incorporating secure computing hardware apparatus 200 is illustrated. Computing device 300 may include a non-secure processor 304, which may be a CPU, graphical processing unit (GPU), or the like. Non-secure processor 304 may communicate with a memory 308; memory 308 may be generally accessible to non-secure processor 304 and/or to secure computing hardware apparatus 200. Secure computing hardware apparatus 200 and memory 256 of secure computing hardware apparatus 200 may be conceptually viewed as separated or isolated from the remainder of computing device 300, including without limitation non-secure processor 304 and memory 308, by a TCB 312; this may indicate that, for instance, access to any component of secure computing hardware apparatus 200, including without limitation memory 256 may only be possible by way of a secure input/output 316 to secure computing hardware apparatus 200. Secure input/output 316 may have strict restrictions on data accepted to and/or output from secure computing hardware apparatus. In an embodiment, secure computing hardware apparatus 200 may encrypt data for storage in memory 308. Secure input/output 316 may receive unencrypted data and output encrypted data. Secure input/output 316 may receive data to be digitally signed and output digitally signed data; digitally signed data may be signed using any means or method described above for implementation of digital signatures, including without limitation data signed according to zero-knowledge proofs and/or DAA protocols.

Still viewing FIG. 3, in an embodiment, non-secure processor 304 and secure computing hardware apparatus 200 initiate a trusted protocol stack upon startup. For instance, and without limitation, computing device 300 may implement a secure boot and/or attested boot protocol. In an embodiment, a basic input/output system (BIOS) that initiates upon startup of computing device 300 may compute a cryptographic hash of a boot loader of an operating system running on computing device 300; cryptographic hash may include boot drivers of one or more processes that initiate when computing device 300 starts up. Secure computing hardware apparatus 200 may then digitally sign cryptographic hash; cryptographic hash with or without digital signature, may be stored in memory 256. Computing device 300 may subsequently refuse to load any process that is not also signed with digital signature; this may in turn be used to perform attested computing procedures as described above.

Continuing to refer to FIG. 3, non-secure processor 304, processor 260, and/or computing device 300 may implement at least a software monitor to enforce security invariants, and protected memory primitives, which may be referred to herein as enclaves. As used herein, a software monitor is a software component that operates in highest privilege mode of the processor, such as without limitation machine mode in the non-limiting example of the RISC-V processor ISA and may have exclusive access to a portion of memory, e.g.

DRAM. The software monitor may check allocation decisions of software operating on computing device 300 and or a plurality of processors and/or computing devices making up a secure enclave for correctness and commit them into hardware configuration registers. Such software may include without limitation operating system, kernel, hypervisor, and/or guest OS. In this nomenclature, an operating system handles scheduling and demand paging, and a hypervisor may multiplex CPU cores of computing device 300 or devices. In a representative embodiment, software monitor may intermediate untrusted system software handling of isolated machine resources. Software monitor may verify decisions made by software operating on computing device 300 and/or devices for any events that may cause change in the protection domain/privilege mode of the computing device 300 and/or devices, including without limitation interrupts and fault handling, and may configure low level hardware resources when in at least a particular privilege mode. Hardware resources may include, without limitation, memory, such as physical memory pages, cache lines, processor cores that include all microarchitectural state, L1 cache and register files, and other resources. Software monitor may consider isolated protection domains including the monitor itself, enclaves, and untrusted software. Software monitor may ensure that resource allocation for one protection domain may not be modified by any other domain.

Still referring to FIG. 3, software monitor may be implemented in microcode, operate in the highest privilege level (e.g. machine mode in RISC-V processor), be implemented in hard coded logic, reconfigurable logic with protections on reconfiguration, or any combination of the foregoing. As a non-limiting example, software monitor may be invoked when software is executed in a secure enclave, and handle context switches between secure enclave mode, to and from less privileged mode(s). Software monitor may receive interrupt requests when operating a secure enclave operation, exit enclave operation including flushing of state and in example parking of enclave execution, and delegate the interrupt back to the operating system. Software monitor may intermediate handling of machine resources analogous to system calls in a typical OS. Software monitor may be conceived of as a state machine having states that may, as a non-limiting example, implement steps as follows: Software monitor may receive an event and authenticate a caller of the event; this may lead to three possibilities: (1) If caller is an OS interrupt and a secure enclave isn't operating, then the OS may receive the event; (2) If caller is an enclave interrupt, and the enclave has the handler, then the enclave may receive the event; otherwise, the enclave may asynchronously exit, meaning enclave cleans sensitive processor state, may park the enclave state in protected memory, and may delegate event to the OS—otherwise, the enclave may receive the event; (3) If event is a monitor call, and caller is authorized, then the request may be validated. If the request is concurrent, it may be handled, if it is invalid, it is thrown out and the caller may be flagged as potentially malicious; if it is valid, and no concurrent operations are happening, the monitor may proceed to change state cleanly (e.g., clean sensitive processor state and then switch privilege modes.

Continuing to refer to FIG. 3, to ensure protection domains are enforced, software monitor may enforce resource state transitions, which may occur in a non-limiting example as follows: if a resource requested is owned by owner (current user) or software monitor itself, the resource may be blocked. A requesting OS may demand the resource, in which case the sensitive processor state may be cleaned, and resource made available; finally the OS may grant the resource to a new owner. Software monitor may include a map of resource to owner, and lock on resource. These resource metadata may be pre-allocated to the monitor's binary image in case of statically partitioned resources such as cores and cache partitions. Software monitor may contain a cryptographic measurement (e.g. a hash) of certificates, keys, and of at least a first enclave. In an embodiment, software monitor may include an associated base address/address mask pair register in hardware that protects the location of the software monitor in memory space from corruption, bitmapped protected memory provisions, and the creation of page tables for each enclave within protected memory.

A secure boot and/or attested boot process may be used to achieve trustworthiness of software monitor, non-secure processor 304, processor 260, and/or computing device 300 may execute a chain of attested boot upon reset to prove that the software monitor has not been tampered with and the at least a first enclave, referred to below as the signing enclave, is correctly constructed, such that core executed within the enclave may be considered trusted. Reset may occur on startup, restart, and/or upon a hard or soft reset of computing device 300.

Continuing to view FIG. 3, a non-limiting example illustrating, an attested boot sequence in a processor with at least one core is presented; this example is provided for expository purposes, and implementation of attested boot, related secure programming using computing device 300 and/or apparatus 200 may be performed according to any processes and/or procedures that may occur to persons skilled in the art upon reviewing the entirety of this disclosure may operate according to an assumption that processor 304, processor 260 and/or computing device 300 have at least a secret generator 204*a*-*b* whose device specific secret, such as without limitation a cryptographic key pair, has been signed by a manufacturer of at least a secret generator 204*a*-*b*, hardware apparatus 200, computing device 300 and/or other component or module described herein, such that one may evaluate the authenticity of the device by proof of possession of a valid signature; a device specific secret has been signed by a manufacturer, as used herein, where the manufacturer, or a device operated by the manufacturer, signs a verification datum, such as a public key, generated by at least a secret generator 204*a*-*b* and/or device identifier using the device-specific secret. Digital signature of manufacturer may be any digital signature as described above. As a result, a verification datum signed by manufacturer may be linked to secure proofs generated by device identifier using device-specific secret, such that manufacturer signature identifies apparatus 200. In an embodiment, link of the manufacturer signature to device-specific secret may be used to verify authenticity of the software monitor by authentic signature of the device and cryptographic proof of construction of the software monitor Still viewing FIG. 3, in an embodiment a first core of a processor, such as processor 260 and/or processor 304 may be initialized; other cores may wait on interrupt from the first core. In an exemplary sequence, upon initialization of a first core, a cryptographic measurement root code may be booted from resistant hardware, such as, without limitation, on-chip read-only memory (ROM), and/or other hardcoded memory or circuitry. Software monitor may subsequently be loaded into memory from at least a non-volatile programmable memory. In an embodiment, all other memory address space may be cleared, zeroed, and/or set to a uniform value to achieve a known initial state. Continuing the illustrative example, at least a secret generator 204 *a*-*b* may generate device-specific secret; as a non-limiting example device identifier 224 and/or key extractor may use device-specific secret to generate a device public/private key pair; alternatively, a pre-shared secret may be loaded from protected memory, such as without limitation on-chip ROM, XOM, hardcoded circuitry, or the like. Further continuing the illustrative example, software monitor may be processed via a one-way cryptographic hash function as described above; an output of cryptographic hash function may be input to a key derivation function (KDF) along with device-specific secret, secure proof derived from device-specific secret, and/or verification datum derived from device-specific secret to generate software monitor public/private key pair. Cryptographic measurement root code may configure computing device 300, processor 304, and/or processor 260 to sign software monitor public key and/or hash of the software monitor using device private key, and/or to cause device identifier to create a secure proof signing software monitor public key and/or hash of software monitor, establishing an attestation certificate of the software monitor. As noted above, measurement root may include dedicated circuitry that configures computing device 300 and/or apparatus 200 to check the authenticity of the software monitor; for instance, the measurement root may generate an at least a first attestation key pair and sign the software monitor's public key with the processor's key system as described above.

In an embodiment, and with continued reference to FIG. 3, secure computing module 200 may be configured to generate a session-specific secret. Session-specific secret may include a secret, which may be generated according to any process as described above, that uniquely identifies a particular instance of an attested boot and/or loading of software monitor as described above, where uniqueness may include any definition of uniqueness as described above. Session-specific secret may include without limitation a random number, for instance as produced using a TRNG, where a number of bits and/or digits of the random number may be sufficiently high to make a duplicate number produced in a subsequent iteration highly improbable. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Alternatively or additionally, measurement root code may configure computing device 300, processor 304, and/or processor 260 to generate a symmetric key for the security monitor, so that it may encrypt its private attestation key and store it for future operations via symmetric key cryptography. Computing device 300 may then resets to ensure key derivation seed (i.e., device-specific secret) and/or device key, or other material used to generate secure proof are safe. In an embodiment, following an attested boot sequence such as without limitation the exemplary attested boot sequence described above, software monitor's integrity may be checked at each subsequent boot, and the software monitor certificate and device certificate may be used to remotely attest authenticity of the software monitor and computing device 300, respectively. Attestation may be conducted in a variety of manners such that the identity of the device is anonymized, e.g. via direct anonymous attestation (DAA), or via modifications to DAA that preserve anonymity even upon initial join request, e.g. by zero knowledge proof that processor 260, processor 304 and/or computing device 300 possess a secret that belongs to a public set, may use an accumulator to prove in zero knowledge possession of one of a set of keys, via sigma proof, or other means.

Still referring to FIG. 3, following cryptographic authentication of software monitor via any number of means, including without limitation according to exemplary embodiments described above, the software monitor may be considered trusted for a given threat model; software monitor may be considered trusted until revoked; alternatively or additionally, software monitor may be considered trusted for a limited period of time, for instance and without limitation by use of time limited session certificates enforced by the local device and/or in combination with a remote system such as, in a non-limiting example, a remote public key infrastructure (PKI), distributed PKI, certificate authority (CA), distributed CA or the like. Software monitor may in turn enforce security invariants enabling the establishment of protected memory primitives referred to as enclaves.

With continued reference to FIG. 3, software monitor may create at least a first privileged enclave, referred to as the signing enclave, that may be used to attest the authenticity of e.g. information measured, computed, sensed or stored on or otherwise facilitated by processor 260, processor 304 and/or system 200. As a non-limiting example, software monitor, once authenticated as described above, may be loaded onto other processor, computing devices, servers, or the like in communication via network or other means with computing device 300 and/or apparatus 200. As a non-limiting example, a first processor, which may include processor 260 and/or processor 304 may act as a master device controlling one or more slave processors; one or more slave processors these may include conventional CPUs with one or more cores, may be graphical processing units (GPUs), machine learning devices, or other types of processors. An attestation sequence, such as without limitation attestation sequence as described above, may be utilized to establish known initial state of one or more slave processors; attestation in attestation sequence may include signature by software monitor using a private key of software monitor, or the like; software monitor may, in other words, function similarly to measurement root code on slave processors. A key exchange may further be performed to establish a secure tunnel, through which master processor 260 may load the software monitor and spawn one or more enclaves as described herein. In such an embodiment it may be impractical to coordinate messaging mailboxes described herein, in such cases symmetric or asymmetric key based communication methods may be utilized, or other secure means known to those skilled in the art. In this way, it may be possible for computing device 300 and/or a system incorporating computing device 300 or apparatus 200 to enforce strong software authenticity and integrity guarantees, for instance. by limiting the software operating on the slave processors to only trusted code, cleaning state between threads or tasks, and other measures that may occur to persons skilled in the art upon reviewing the entirety of this disclosure.

Still referring to FIG. 3, use of embodiments of secure computing modules as described and/or disclosed above in attested computing, attested boot, or other secure computing procedures as described above may restrict access to the root cryptographic keys to a small, trusted environment which serves a well-defined narrow purpose, is initialized at boot, and is rendered unavailable thereafter. Embodiments of key derivation schemes as described above may endow post-boot environments with corresponding cryptographic measurement, and cryptographic keys unique to secure computing apparatus 200 a device incorporating secure computing apparatus 200, and/or at least a secret generator 204*a-b*, and/or post-boot software as described above; such keys may be used to perform attestation and prove to a remote party that they are connected to a specific software on a specific device. A device's root cryptographic keys may be provisioned and re-computed in a restricted, trusted environment at boot, for instance by implementing an attested boot procedure as described above, and may resist an adversary attempting to extract information about the root key by observing the availability of various device resources while the cryptographic operations on keys take place; such resources may include but are not limited to the core micro-architecture, caches, branch prediction and history structures, network-on-chip with its queues and arbiters, memory controller state, as well as the more nebulous resources such as electric and thermal power. Attested boot procedures as described above may take as input an untrusted boot image in some format, and initialize system memory with the boot image, while preserving the integrity and confidentiality of any machine resources used by the boot mechanism. A post-boot environment so initialized may be endowed with a measurement, unique keys, and a certificate cryptographically binding its measurement and keys to a given device; the post-boot environment may be then be trusted to safeguard its keys. In an embodiment, a malicious post-boot environment may be unable to compromise a different, honest one by leaking its own keys.

In an embodiment, and continuing to refer to FIG. 3, a post-boot boot environment may be able to employ its keys to implement secure persistent storage by encrypting data with its keys, such as without limitation software monitory keys, or other keys not directly created using module-specific secret. Such encrypted data may be stored in an untrusted location without permitting another software to expose the stored data in plaintext. Where key derivation scheme supports unlinkable signatures as described above, attestation with derived keys described above may be unlinkable: two attestations originating from the same software on the same device may be indistinguishable from attestations by the same software on different devices. Likewise, two attestations by different software on the same device may be indistinguishable from two attestations by the corresponding software on different devices. This property may be achieved by randomizing both the attestation keys and their corresponding certificate without destroying the cryptographic link between them. Attested boot processes may be used, without limitation, to perform secure and verifiable over-air software and/or firmware updates to a device incorporating secure computing apparatus 200 and/or to a remote device.

Computing device 300, processor 260, and/or processor 304 may implement memory isolation by any number of means. In non-limiting example, the computing device 300, processor 260 and/or processor 304 may isolate layer 1 (L1) cache and processor core state defining page tables that control virtual memory and L1 cache state by enforcing security invariants that require flushing of core private caches between every transition from enclave to non-enclave modes. Microarchitectural state of a core may be cleaned by sanitizing the translation look-aside buffer (TLB) and branch history table. In an embodiment, a software monitor, including without limitation a software monitor as described above, which may be loaded from cryptographically measured initial state and/or in privileged machine mode, may be relied upon to clean caches, TLB, and/or branch history table by overwrite or register/buffer zeroing via hardware controls. Last layer cache (LLC) and/or cache coherence channels of processor 260 and/or processor may be protected by enforcing locks on enclave memory accesses to DRAM, such that only one enclave may access its memory assignment. These may be implemented using a software monitor loaded from cryptographically measured initial state and in privileged machine mode, via dedicated hardware e.g. a cross bar switch, or other methods as will be apparent to those skilled in the art. Memory isolation of software monitor elements may alternatively or additionally include restriction of direct memory access (DMA) by subsystems of computing device 300 to memory owned by the software monitors and enclaves. In an embodiment, DMA access may be limited using a whitelist to dedicated DRAM regions that are not occupied by an enclave. Additional isolation mechanisms may include methods to obfuscate memory access patterns, such as without limitation via oblivious RAM (ORAM) to protect against memory access pattern attacks, protected hard disk regions, cache modifications, or any other modifications that may occur to persons skilled in the art upon reviewing the entirety of this disclosure. Memory isolation may additionally be implemented by enforcing hardware invariants to require flushing of any shared resources before context switches, where sharing may be a function of time-multiplexed or spatially (e.g. memory address) multiplexed means, including flushing of "in flight" instructions. Additionally or separately, flushing of shared resources before context switches from operation of enclave to other protection domains may be implemented via a sequence of software instructions, e.g. via overwrite mechanisms. In the case of encrypted memory systems or other encrypted components, flushing of state may be sufficiently achieved by overwriting via software instruction, via hardware erase primitive of the encryption/decryption key(s), or other means known to those skilled in the art.

Still viewing FIG. 3, in an embodiment, processor 260, processor 304 and/or computing device 300 may implement last level cache (LLC) address input transformation via cache address shifter to ensure that LLC placement is determined by privileged software only, via page tables, and yields contiguous memory regions. A number of bits of cache address shift may be increased or decreased depending on the width of contiguous memory regions desired. Caches may be isolated using set partitioning (e.g. page coloring), way partitioning (e.g. Intel's Cache Allocation Technology), or dynamically allocated way guard, or other such partitioning methods. Processor 260, processor 304, computing device 300, and/or apparatus 200 may implement hardware modifications to ensure that untrusted operating system cannot modify page tables of the enclave, that TLB misses may not be used to search outside of page tables of the enclave, which may leak information, and/or that OS operated page tables cannot access enclave page tables. In an embodiment, processor 260, processor 304 and/or computing device 300 may implement this functionality by utilizing a page walker input check circuit that implements a logical AND of the enclave virtual address space mask and the TLB miss virtual address, and/or by checking if this is within the enclave virtual memory space base register. A logical output of this system may yield a determination of whether the system page table base range or enclave page table base range is being selected and may direct a state machine to choose an appropriate fault handler, thus avoiding leakage of information between enclave and OS memory resources. Similar logic may be implemented to protect against access to memory regions allocated to enclaves and software monitors, as will be apparent to those skilled in the art upon reviewing the entirety of this disclosure.

Continuing to refer to FIG. 3, a representative embodiment of an enclave as described herein may store private data necessary to execute at least a software routine, including page map, threading information, thread state(s), software locks and/or mutexes, validity of protection domain allocation, host application program counter and stack pointer, enclave page table base address, threat entry point, thread entry stack pointer, fault handler for program counter and stack counter, fault registers, and asynchronous state registers, runtime code, application code, application data, system call proxy mechanisms, as well as communication primitives, e.g. mailboxes for receiving messages from other enclaves, and so forth, isolated from observation by the OS and other software by allocating physical memory spaces exclusively allocated to the enclave. Memory isolation within or by enclave may be implemented by any means described herein or as may be apparent to those skilled in the art, upon reviewing the entirety of this disclosure. Isolation of enclave physical memory allocations from untrusted software, other enclave allocations, and software monitor may be implemented using the software monitor described above operating in higher privilege mode than untrusted software, in microcode, or other means known to those skilled in the art. Enclaves may be pre-allocated statically, may be dynamically created and destroyed. In either case enclaves may be assigned private physical memory, for instance as described above. Virtual memory pages and page tables may be implemented within enclave private physical memory.

Still referring to FIG. 3, enclave integrity may be ensured by any number of means including cryptographic measurement, such as without limitation via hash function. Software monitor may be utilized to enforce integrity of the enclave upon creation and at subsequent points in time as needed. To ensure that enclaves can be uniquely identifiable even in the case that two enclaves contain identical code, in representative embodiment enclaves may be allocated in memory in monotonically ascending or descending range, for example, and without limitation in nonlimiting example before or after the at least a first enclave, based upon some parameter, such as enclave size, time of creation, or any other method as defined upon system boot or reboot. In an embodiment, enclave creation may include allocation of a free segment of memory controlled by or supervised by at least a software monitor, along with a unique identifier. OS may subsequently create page tables and metadata structure into which the enclave private data may be loaded, as supervised in representative embodiment by the software monitor, and allocate machine resources to the enclave. Once created, data from untrusted memory may be copied from external input buffers to enclave prior to execution of enclave runtime (in order to protect memory access patterns).

Continuing to refer to FIG. 3, to facilitate communication between enclaves, software monitor and/or other privileged service may allocate one or more mailboxes for the enclave to receive authenticated messages. In an embodiment, a secure mailbox system may be set up such that a sender may communicate via the software monitor a message along with signature of the sender (e.g. cryptographic measurement of the sending enclave. In an embodiment, message receipt may be enabled by the receiver via an API call. In another embodiment, mailboxes may be made open to receiving any messages, but sending messages may require provisioning of collateral by sender, sender may be limited to a particular number of messages per unit time, may have sending privileges modulated if the recipient believes the sender is behaving maliciously (e.g. attempting denial of service type attacks), and other means as may be configured by the processor 260. In an embodiment, mailbox addresses and identities may be available via calls to the OS, to the software monitor, or other privileged domain. In an embodiment, remote attestation of an enclave itself may be possible, as well as attestation of a processor 260, processor 304 and/or computing device 300 or devices, along with certain listed properties. As such, in an embodiment, enclave mailbox system may be configured to enable communication without further attestation once initially authenticated either directly to the enclave, or to the device hosting the enclave. Such a system may in non-limiting example operate via certificates or session tokens, such certificates or session tokens may be time limited, message volume limited, bandwidth limited, or otherwise permissioned. Mailboxes may be permissioned for particular types of data based on trust level, may be permissioned based upon time of day, and the like.

Still viewing FIG. 3, apparatus 200 and/or computing device 300 may implement one or more solutions to prevent side-channel and/or speculative execution attacks. In such attacks, a malicious actor may attempt any number of speculative execution-based attacks, via injection of associations at the macro-fusion stage, observation of microarchitectural register behavior, timing analysis and so forth. To solve this issue of side-channel leakage of private data, processor 260, processor 304 and/or computing device 300 may be modified to enforce security invariants such as without limitation through operation in virtual address memory space of an enclave. In an embodiment, processor 260, processor 304 and/or computing device 300 may utilize the following sequence of operations prior to committing instructions to the reorder buffer, or any similar instruction commitment phase: (1) upon entry into secure enclave protection domain, instruction fetch unit may be loaded with the program counter (PC) range of address space allocated to the enclave runtime, as is described above; (2) the fetch unit may proceed to fetch instruction, decode the instruction, and assess whether the address is within the PC range whitelist; (3) if within PC range, scheduling of instructions may allowed by the invariant, and if the instruction's address is dependent on other instructions before making a determination, it may be held until this determination may be made; (4) if the address is outside of PC range, fault handler of software monitor assigned to the managing the enclave owning the thread being operated may be invoked. For any memory accesses by processor 260, processor 304, and/or computing device 300 related to shared state, including L1/L2 and LLC accesses, instructions may be handled serially (as opposed to out of order), and their access permissions may be handled by the enclave's permissions. In an embodiment, this serialization of shared state instructions may still allow for macro and micro-fusion in the event all fused micro-operations are within the PC range. In an embodiment, the scheduling of instructions utilizing this security invariant may be implemented using cross bar switch or buffered cross bar switch algorithm. In an alternative embodiment to the software monitor, dedicated hardware or microcode may be implemented to enforce memory access policies.

In a less secure implementation, and still referring to FIG. 3, it may be feasible to make some claims of protection without hardware modifications. In the case of the RISC-V processor and similar RISC-based architectures, Processor 260 may utilize a primitive known as the physical memory protection (PMP) to whitelist memory access for specific privilege modes. In this case, as compared with the hardware implementations described above, PMP whitelisted memory ranges may be utilized to store page tables that contain both operating system (OS) and enclave elements, operated within an enclave. Such an approach is less efficient and must assume clear isolation of OS vs enclave elements throughout execution. In such an implementation, cryptographically derived key systems may be established via FPGA-based PUFs as described herein, via pre-shared secrets, combinations thereof, or other means of creating a root of trust.

In an embodiment, processor 260, processor 304 and/or computing device 300 may implement "out of order" scheduling and execution, also known as dynamic scheduling and execution of instructions in order to make more efficient use of instruction cycles that would otherwise be wasted. Dynamic execution implementations have to date been challenging to implement when it is also necessary to ensure isolation of private data for secure code execution in presence of untrusted software. Specifically, it can be unclear until after decoding of fetched instructions whether an instruction pertains to private data. In Tomasulo's algorithm for dynamic scheduling, instructions may proceed in "issue", "execute", "write result", and "commit"—in the write result stage, as compared to in order execution, the results of instructions are put in a re-order buffer (ROB). The contents of this buffer may then be used when executing other instructions depending on these instructions. Explicitly, the challenge for isolation of private data in this case may be that the execution of instructions out of order may lead to ROB writing to memory addresses or registers outside of the protected memory regions defined in the enclave model described above. Tomasulo's algorithm serves as the basis for modern processors, e.g. as implemented in the pipeline of the Intel x86-64 Core microarchitecture further complicate the issue of memory isolation. As compared to Tomasulo's algorithm, the Core microarchitecture includes an in-order issue front end, which pre-fetches instructions and decodes these into micro-operations. This is analogous to Tomasulo's "Issue" stage. Second stage out of order execution core performs actual re-ordering of these micro-operations, corresponding to the "execute" stage of Tomasulo. A final third stage in-order retirement unit combines functionality of the write result and commit functions of Tomasulo. Intel's Core integrates macro-fusion, where common instruction pairs are fused into a single instruction during decoding. Micro-fusion further combines the number of micro-operations from the same macro operation, a result of macro-fusion, to increase efficiency of the processor. Finally, Tomasulo and Intel's further optimizations utilize a family of techniques based on register renaming, such that the processor maps architectural registers to a set of micro-architectural registers and using a new unused register as the destination register of this renaming. Microarchitectural register locations handle out of bound speculative instruction fetches and so forth here, prior to commit stage, where it moves to the architectural register. Further, store forwarding is an optimization technique that effectively skips a store operation by forwarding a load instruction directly from a store to a load. The above-described approaches may be combined with any or all process steps and/or protocols as described above.

In embodiments, use of secure computing hardware apparatus 200 in operations including without limitation those described above and/or in conjunction with secure processor or memory may aid in protection from both external and invasive attacks. For instance, "stack overflow" attacks to obtain data may be frustrated by the use of encryption in memory storage, while attempts to write hostile executable code may be prevented by isolated memory addresses for specific purposes; for instance, only certain memory sectors may be permitted to contain executable code, or executable code may be required to be encrypted according to memory encryption protocols as described above. Embodiments may be designed to prevent speculative execution attacks to recover secure memory, for instance by controlling memory access via secure computing hardware apparatus, and/or by making access privilege determinations a prerequisite to any memory access.

Referring again to FIG. 2, initialization and/or manufacture of secure computing apparatus 200, and/or of any hardware and/or computing device, whether containing secure computing apparatus 200 or not, may be performed and/or implemented in a way that permits testing and verification of one or more circuit elements without providing manufacturers or other entities and/or devices with a way to use such verification and/or testing components and/or elements to circumvent security and/or intended operations of such hardware and/or computing devices, for instance by, in the case of devices including a secure computing apparatus 200, accessing module-specific secrets or other such information in deployed secure computing apparatuses; a purpose of such an approach may be to maintain the ability to perform industry standard test practices while ensuring the confidentiality and integrity of sensitive material, e.g. key material and all derived values. This may be accomplished using a state machine 264 for the tracking of lifecycle states of each manufactured device. State machine 264 may include a device that is switchable between two or more states, and is integrated in and/or connected to a computing device and/or hardware device such as without limitation secure hardware apparatus 200, so that in each of the two or more states such a device has distinct testing and/or operational capabilities; state machine 264 may be an irrevocable state machine: that is, transition of state machine 264 from an initial state, which may be denoted herein as "not provisioned," to a state permitting testing, which may be denoted herein as "test only" or a state for use in production, which may be denoted herein as "production only," may not be reversed to "not provisioned state." In an embodiment, an irrevocable state machine 264 in "test only state" is impossible to convert and/or transition to a "production only state," and an irrevocable state machine in "production only" state maybe impossible to convert and/or transition to a "test only state"; this may prevent use of the "test only state" to discover keys and/or module-specific secrets that have been used or will be used from one or more secure computing processes such as digital signing, attested computing, or the like, as described in this disclosure, and/or to prevent use of "test only state" to circumvent security and/or intended operation of a deployed hardware device and/or computing device either prior to or after deployment thereof in production. In an embodiment, an irrevocable state machine 264 in "test only" and/or "production only" state may be capable of transition to only one other state: deactivation state. Deactivation state may include a state in which users and/or other devices may be able to verify that a hardware device and/or computing device incorporating state machine 264, such as a secure computing module 200, is deactivated and/or at an end of a deployed lifecycle, and thus not trustworthy. Alternatively or additionally, transition to deactivation state may close a self-destruct element or circuit (not shown). Self-destruct mechanism may include, without limitation a short circuit that on power up will generate heat and destroy or denature one or more parts of a hardware device and/or computing device such as without limitation a secure computing module 200; alternatively or additionally, self-destruct mechanism may generate a potential difference across one or more circuit components that is sufficient to destroy such components, such as without limitation an excessive or "breakdown" potential difference across a gate of a field-effect transistor, diode, or the like. Self-destruct mechanism may deactivate one or more logic elements, output ports, and/or pathways connecting and/or within one or more components of a hardware device and/or computing device incorporating self-destruct mechanism and/or state machine 264; as a non-limiting example, at least a secret generator 204*a-b* and/or one or more components thereof, including without limitation one or more PUFs, may include one or more elements that may be destroyed and/or deactivated by application of excessive voltage, current, and/or heat, which may have the effect of erasing device-specific secret. As a further non-limiting example, one or more elements of key extractor 220, device identifier, or the like may contain elements that may be destroyed and/or deactivated by application of excessive voltage, current, and/or heat, preventing generation and/or output of secure proofs, verification data, keys and/or any other function and/or data as described above.

Still referring to FIG. 2, in an exemplary embodiment provided for illustrative purposes only, an irrevocable state machine 264 may be implemented using two one-time programmable fuse bits to encode 4 states: (1) two bits set to 11, signifying and/or implementing a "not provisioned" state, (2) two bits set to 10 indicating and/or implementing a "test only state", (3) two bits set to 01, indicating and/or implementing a "production only state," and (4) two bits set to 00 indicating a "recalled" or "end of life" state where '1' describes an OTP/fuse bit before it is irreversibly written. By the nature of OTP/fuses, there exists no transition out of the "recalled" state on any given device, and no possible pathway to transition between "test only" and "production only" state. Persons skilled in the art, on reviewing the entirety of this disclosure, will be aware of various additional or alternative binary fuse configurations that may be used to represent four states. Persons skilled in the art will be aware of various additional or alternative ways in which such an irrevocable state machine 264 may be implemented.

In an embodiment, and still referring to FIG. 2, when state machine 264 is in "production only state", placement of state machine 264 into that state may effect a connection between elements of a hardware device and/or computing device, such as without limitation secure computing device 200 and/or component thereof; for instance, in the case of a secure computing device 200, placement into "production only state" may communicatively connect at least a secret generator module 204*a-b* to device identifier 224, SMC circuit elements, and/or key extractor 220 as described above, may effect connections between PUF bits or other elements of secret generator 204*a-b* or any other component or the like.

With continued reference to FIG. 2, when state machine 264 is in "test only state", state machine 264 may connect one or more components and/or circuit elements of a hardware device and/or computing device such as without limitation secure computing apparatus 200 to a debug interface 268. For instance, and without limitation, debug interface 268 may allow access to one or more aspects of secure computing apparatus 200 and/or one or more components thereof. For instance, debug interface 268 may permit a user or device testing secure computing apparatus 200 and/or one or any of its components to receive outputs of module-specific secrets, PUFs, key extractors, secure proofs, and/or any other element of data described as generated, stored, input, or output to, from, or by any component, circuit, circuit element, module, or other portion of secure computing apparatus 200 and/or computing device 300 containing a secure computing apparatus 200 as described above. In operation, a certain number of secure computing apparatuses 200 in a production lot may be placed in "test only" state, via state machine 264 to be analyzed and to verify quality and reliability through debug interface 268, while the remainder of such devices may be placed in "production only" state via state machine 264 to function as described above and to defeat analysis.

Still referring to FIG. 2, placement of state machine 264 in "test only" state may act to block and/or deactivate one or more elements of a hardware device and/or computing device incorporating state machine 264, such as without limitation a secure computing apparatus 200 and/or a device incorporating the secure computing apparatus 200; for instance, and without limitation, placement of state machine 264 in "test only" mode may activate blocking circuitry that prevents output from one or more elements of secure computing apparatus 200, may activate one or more self-destruct mechanisms as described above, or the like. For instance, and without limitation, in the case of a secure computing device 200 incorporating state machine 264, setting state machine 264 to "test only" state may deactivate a key extractor 220, a device identifier 224, and/or one or more inputs and/or outputs to, between, and/or from such elements; debug interface 268 may be enable to access non-deactivated elements and/or to access elements that are severed from each other and/or from inputs and/or outputs by any of the above-described means. Placement of state machine 264 in "production only" state may act to block and/or deactivate debug interface 268 and/or one or more components thereof; this may be accomplished, without limitation, by activating blocking circuitry to prevent debug interface 268 from inputting to and/or outputting from one or more components and/or elements of a hardware device and/or computing device such as a secure computing apparatus 200, by using a self-destruct mechanism to physically destroy, deactivate, or otherwise sever one or more such inputs and/or outputs, and/or by blocking and/or denaturing one or more components of debug interface 268.

With continued reference to FIG. 2, attestation as described above in reference to FIG. 3 may include attestation and/or output of a current state of state machine 264; for instance, where a hardware device, computing device, and/or secure computing apparatus includes a state machine 264 in "test only" state, "production-only" state, and/or "recalled" state, this state may be included in a message and/or incorporated into a digest to be signed as part of attestation. A device incorporating state machine 264 may alternatively or additionally be configured to output a state of state machine upon request by a remote device.

Figure 4:
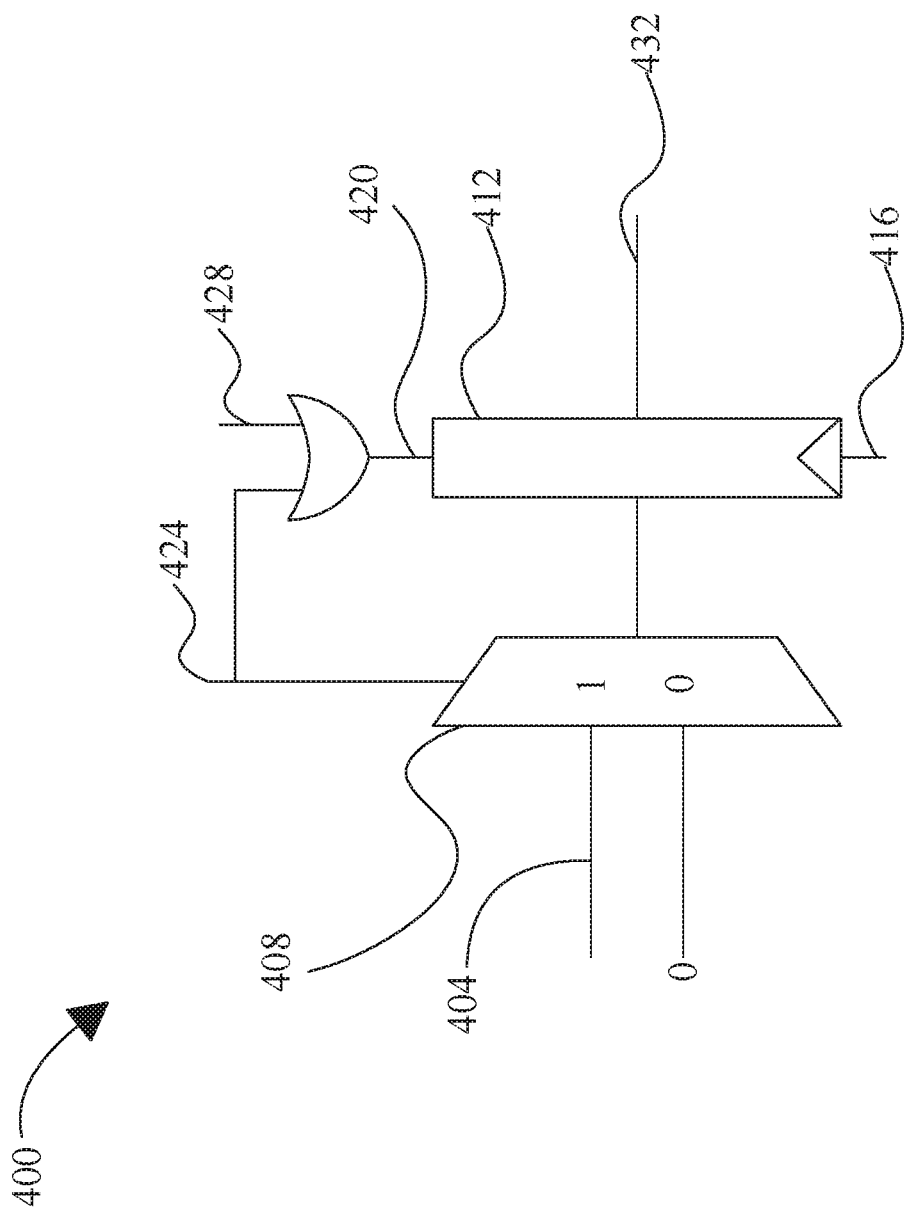
FIG. 4 is a schematic diagram illustrating an exemplary embodiment of a circuit for limited-time output of secret data.

Referring now to FIG. 4, an exemplary embodiment of a circuit 400 for limited-time provision of a secret such as a session-specific secret and/or module specific secret to and/ or from one or more components of secure computing apparatus 200 and/or in other contexts is illustrated; circuit 400 may, for instance, provide for provision of a seed, root key, session key, or the like from secure computing apparatus 200, secret generator module 204a-b, and/or other component during a secure boot phase and prior to non-secure booting of a device, limiting any potential root key or other exposure. In an embodiment, and without limitation, a secret input 404 may be connected to a selection circuit 408 such as without limitation a multiplexor; selection circuit 408 may act to output secret input 404 to its output when in a first state, and a mask or dummy value, such as one or more 0s to its output when in a second state; where selection circuit 408 has a single-bit output, there may be a plurality of single bit circuits 400, or alternatively each element of a circuit 400 may have a plurality of single-bit outputs, represented here by a single wire for simplicity. Selection circuit 408 may connect via its output to a memory device 412, which may be a register; memory device 412 may have a clock input 416 and a enable input 420. Enable input 420 may cause memory device 412 to input new data to memory from selection circuit 408 when activated, such as for instance when input is "1" for an "active high" input. A reset input 424 may cause selection circuit 408 to output data from secret input 404 to memory device 412 while activating the enable input 420. A "disable" input 428 may activate enable input 420 independently of reset input 424. In operation, device incorporating circuit 400 may activate recent input 424 on secure boot-up, permitting secret input 404, which may be conveying a device-specific secret, secure proof, key, and/or seed from any component of secure computing apparatus 200, such as without limitation secret generator module 204a-b, device identifier 224, and/or key extractor 220, to be read to memory device 412; reset 242 may then be deactivated, such that output from selection circuit 408 is a mask output and memory device 412 is not taking inputs, so that memory device 412 is providing secret input data to output 432 to device identifier 224, key extractor 220, or another component using secret input data for secure boot and/or attested boot operations. Upon completion of secure boot, such as signing of software monitor or other such step requiring secret input data 404 for instance as described above, a component of an apparatus incorporating circuit 400 may input an activation at disable input 428, causing memory device 412 to read in, and thereafter output, mask or dummy value. As a result, secret input data from secret input 404 may only be exposed to any circuitry of secure computing apparatus 200 or other device incorporating circuit 400 during secure boot.

Any element of secure hardware apparatus 200 and/or any circuit, module, and/or component thereof may be manufactured to any suitable standard; for instance, any such element may be manufactured to be "glitchless" so as to prevent any timing-based or other intrusion exploits that attack anomalous behaviors. Any element of secure hardware apparatus 200 and/or any circuit, module, and/or component thereof may be manufactured to be obscured, to incorporate non-analyzable circuit elements 212 as described above, to be opaque to one or more radiological analysis techniques such as ion beam microscopy, or the like.

Figure 5:
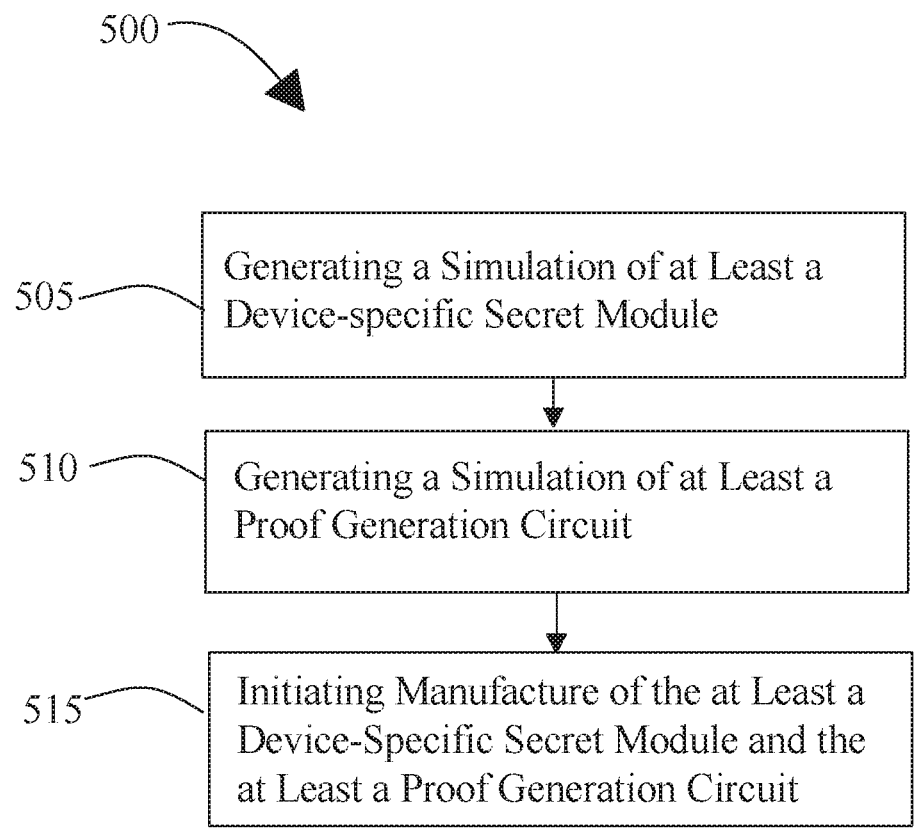
FIG. 5 is a flow diagram illustrating an exemplary method of manufacturing a secure computing hardware apparatus.

Referring now to FIG. 5, an exemplary embodiment of a method 500 of manufacturing a secure computing hardware apparatus 200 is illustrated. At step 505, a simulation of at least a secret generator 204a-b is generated. At least a secret generator 204a-b may include at least an output terminal 208. At least a secret generator 204a-b is configured to generate a secret output, as a function of at least a module-specific secret; at least a secret output may be generated at the at least an output terminal 208. In an embodiment, generation of the simulation of the at least a secret generator 204a-b may be performed as described above in reference to FIGS. 1-2.

Still viewing FIG. 5, at step 510, computing device generates a simulation of at least a device identifier 224. At least a device identifier 224 is communicatively connected to the at least a secret generator 204a-b; for instance, at least a device identifier may include at least an interior input terminal 236 connected to the at least an output terminal 208, and at least an exterior output terminal 232. The at least a device identifier 224 is configured to produce at least a proof output comprising a secure proof of the module-specific secret, as a function of the at least a secret output, at the at least an exterior output terminal 232. In an embodiment, this may be implemented as described above in reference to FIGS. 1-2.

With continued reference to FIG. 5, at step 515, computing device initiates manufacture of the at least a secret generator 204a-b and the device identifier 224, as a function of the simulation of the at least a secret generator 204a-b and the simulation of the at least a device identifier 224. Initiation of manufacture, as used herein, is defined as performing one or more initial steps in manufacturing secure computing hardware apparatus 200. Initiation of manufacture may include generation of one or more instructions to manufacture a component, including without limitation secret generator 204a-b or any component thereof, device identifier 224 or any component thereof, verification information circuit 252 or any component thereof, and the like. Initiation of manufacture may include generation of one or more mask layers. Initiation may include one or more synthesis steps. Initiation may include any step-in simulation as described above. Initiation of manufacture may include performing one or more physical manufacturing steps, including without limitation any steps for fabrication or communicatively connecting of components or modules as described above in reference to FIGS. 1-2.

In an embodiment, secure computing hardware apparatus 200 and methods for manufacture thereof present an efficient, secure way to identify a device using a tamper-resistant circuit or combination of circuits that preserve module-specific secrets while providing accurate and verifiable proofs of machine identities. In embodiments, the use of hardware-encoded secrets such as hardcoded digital signature processes, hardware-encoded private keys, or PUF generated private keys or challenge responses provide signature and device-identification protocols that are difficult to predict and uniquely linked to the device enclosing secure computing hardware apparatus 200. Secure computing hardware apparatus 200, as manufactured according to processes disclosed herein, may be used as a basis for attested computing, secure communication, and/or block chain verification and transaction entry.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
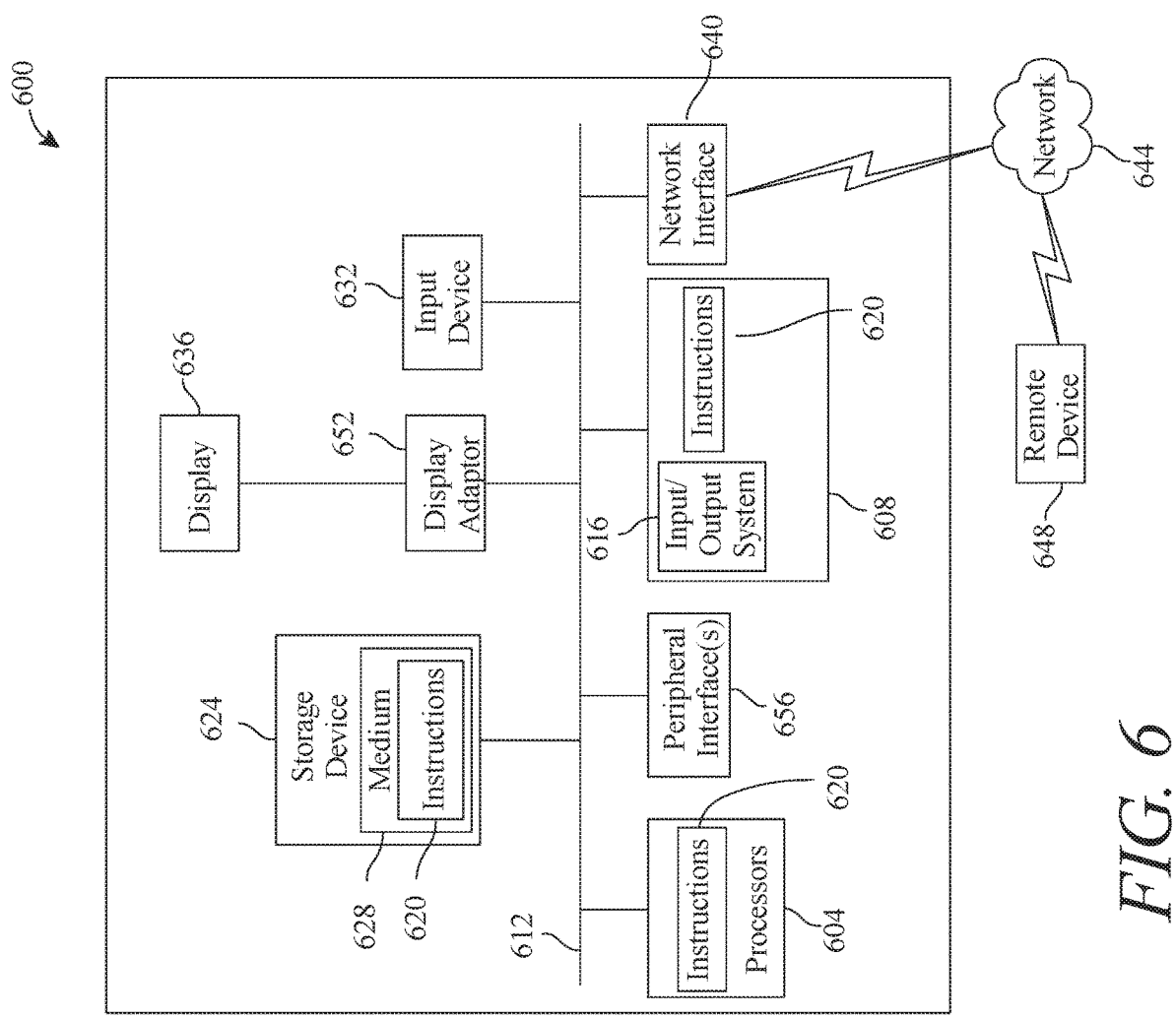
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of manufacturing a secure computing hardware apparatus, the method comprising:
   receiving at least a secret generator, wherein the at least a secret generator is configured to generate a module-specific secret;
   receiving a device identifier, wherein the device identifier is configured to produce at least an output comprising a secure proof of the module-specific secret; and
   communicatively connecting the device identifier to the secret generator, wherein communicatively connecting the device identifier to the at least a secret generator further comprises:
      manufacturing a state machine having at least an input and at least an output, wherein the state machine is in a first state representing a non-provisioned circuit wherein the at least an input does not connect to the at least an output;
      connecting the at least an input to the at least a secret generator device;
      connecting the at least an output to the device identifier;
      blocking the at least an input, which is connected to the at least a secret generator device, and the at least an output, which is connected to the device identifier; and
      converting the state machine to a second state representing a provisioned circuit, wherein the at least an input is connected to the at least an output.

2. The method of claim 1, wherein receiving the at least a secret generator further comprises fabricating the at least a secret generator.

3. The method of claim 2, wherein fabrication of the at least a secret generator further includes fabrication of at least a non-analyzable circuit element.

4. The method of claim 3, wherein fabrication of at least a non-analyzable circuit element further comprises fabrication of a circuit element denatured by probing.

5. The method of claim 3, wherein fabrication of at least a non-analyzable circuit element includes fabrication of at least a circuit element having an output unpredictable by circuit analysis.

6. The method of claim 3, wherein fabrication of at least a non-analyzable circuit element further comprises fabrication of an element that performs a physically unclonable function.

7. The method of claim 6, wherein the physically unclonable function further comprises a quantum confinement physically unclonable function.

8. The method of claim 1, wherein the secret generator is further configured to output a plurality of bits as a function of the module-specific secret.

9. The method of claim 1, wherein the at least a secret generator further comprises at least a first secret generator having at least a first secret share of the module-specific secret and at least a second secret generator having a second secret share of the module-specific secret.

10. The method of claim 1, wherein the device identifier is further configured to perform the secure proof using a challenge-response protocol.

11. The method of claim 1, wherein the device identifier is further configured to perform the secure proof using a digital signature.

12. The method of claim 11, wherein the device identifier is further configured to perform the secure proof using a direct anonymous authentication protocol.

13. The method of claim 1, wherein the device identifier is further configured to perform the secure proof by performing a secure multiparty computation using a first set of inputs from the at least a secret generator and a second set of inputs from at least an exterior input according to an oblivious transfer protocol.

14. The method of claim 1 further comprising:
   receiving a key extractor configured to extract a private key from the module-specific secret module; and
   communicatively connecting the key extractor to the secret generator and the device identifier.

15. The method of claim 1 further comprising:
receiving a verification information circuit, the verification information circuit configured to generate verification information to evaluate the secure proof; and
communicatively connecting the verification information circuit to the secret generator.

16. The method of claim 15, wherein:
the secure proof is a digital signature protocol using a private key derived from the module-specific secret; and
the verification circuit is further configured to generate a public key associated with a private key.

17. The method of claim 1, further comprising communicatively connecting a memory to the device identifier.

18. The method of claim 17, wherein the device identifier is further configured to encrypt data written to the memory using a private key.

19. The method of claim 17, wherein the memory includes at least a portion connected only to the secure computing hardware apparatus.

20. The method of claim 1 further comprising:
receiving a processor; and
communicatively connecting the processor to the device identifier.

* * * * *